United States Patent
Wu

(10) Patent No.: US 9,009,480 B1
(45) Date of Patent: Apr. 14, 2015

(54) TECHNIQUES FOR HANDSHAKE-FREE ENCRYPTED COMMUNICATION USING PUBLIC KEY BOOTSTRAPPING

(71) Applicant: Yunnam Wu, Palo Alto, CA (US)

(72) Inventor: Yunnam Wu, Palo Alto, CA (US)

(73) Assignee: Facebook, Inc., Menlo Park, CA (US)

( * ) Notice: Subject to any disclaimer, the term of this patent is extended or adjusted under 35 U.S.C. 154(b) by 0 days.

(21) Appl. No.: 13/788,717

(22) Filed: Mar. 7, 2013

(51) Int. Cl.
*H04L 9/32* (2006.01)
*H04L 9/08* (2006.01)

(52) U.S. Cl.
CPC .................... *H04L 9/0861* (2013.01)

(58) Field of Classification Search
CPC ........ H04L 9/08; H04L 63/061; H04L 9/0844
USPC .......................................................... 713/171
See application file for complete search history.

(56) References Cited

U.S. PATENT DOCUMENTS

| | | | |
|---|---|---|---|
| 7,457,946 B2 * | 11/2008 | Hind et al. .................... | 713/153 |
| 2003/0070074 A1 | 4/2003 | Geller et al. | |
| 2003/0079143 A1 * | 4/2003 | Mikel et al. .................... | 713/200 |
| 2004/0078593 A1 * | 4/2004 | Hind et al. .................... | 713/201 |
| 2006/0206932 A1 | 9/2006 | Chong | |
| 2007/0100796 A1 | 5/2007 | Wang | |
| 2009/0276788 A1 | 11/2009 | Homma | |

* cited by examiner

*Primary Examiner* — Teshome Hailu
(74) *Attorney, Agent, or Firm* — Kacvinsky Daisak Bluni PLLC

(57) ABSTRACT

Techniques for handshake-free encrypted communication using public key bootstrapping are described. An apparatus may comprise a key component, a message component, and a network component. The key component may be operative to generate a symmetric encryption key. The message component operative to construct a message, the constructed message comprising a key section and a data section, the key section encrypted using an asymmetric encryption key and comprising the symmetric encryption key, the data section encrypted using the symmetric encryption key. The network component may be operative to transmit the message to a device. Other embodiments are described and claimed.

20 Claims, 18 Drawing Sheets

TECHNIQUES FOR HANDSHAKE-FREE ENCRYPTED COMMUNICATION USING PUBLIC KEY BOOTSTRAPPING

SUMMARY

The following presents a simplified summary in order to provide a basic understanding of some novel embodiments described herein. This summary is not an extensive overview, and it is not intended to identify key/critical elements or to delineate the scope thereof. Its sole purpose is to present some concepts in a simplified form as a prelude to the more detailed description that is presented later.

Various embodiments are generally directed to techniques for handshake-free encrypted communication using public key bootstrapping. Some embodiments are particularly directed to techniques for handshake-free encrypted communication which leverages an ongoing communications relationship between two devices to maintain a cache of a public asymmetric encryption key. In one embodiment, for example, an apparatus may comprise a key component, a message component, and a network component. The key component may be operative to generate a symmetric encryption key. The message component may be operative to construct a message, the constructed message comprising a key section and a data section, the key section encrypted using an asymmetric encryption key and comprising the symmetric encryption key, the data section encrypted using the symmetric encryption key. The network component may be operative to transmit the message to a device. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

DETAILED DESCRIPTION

Figure 1:
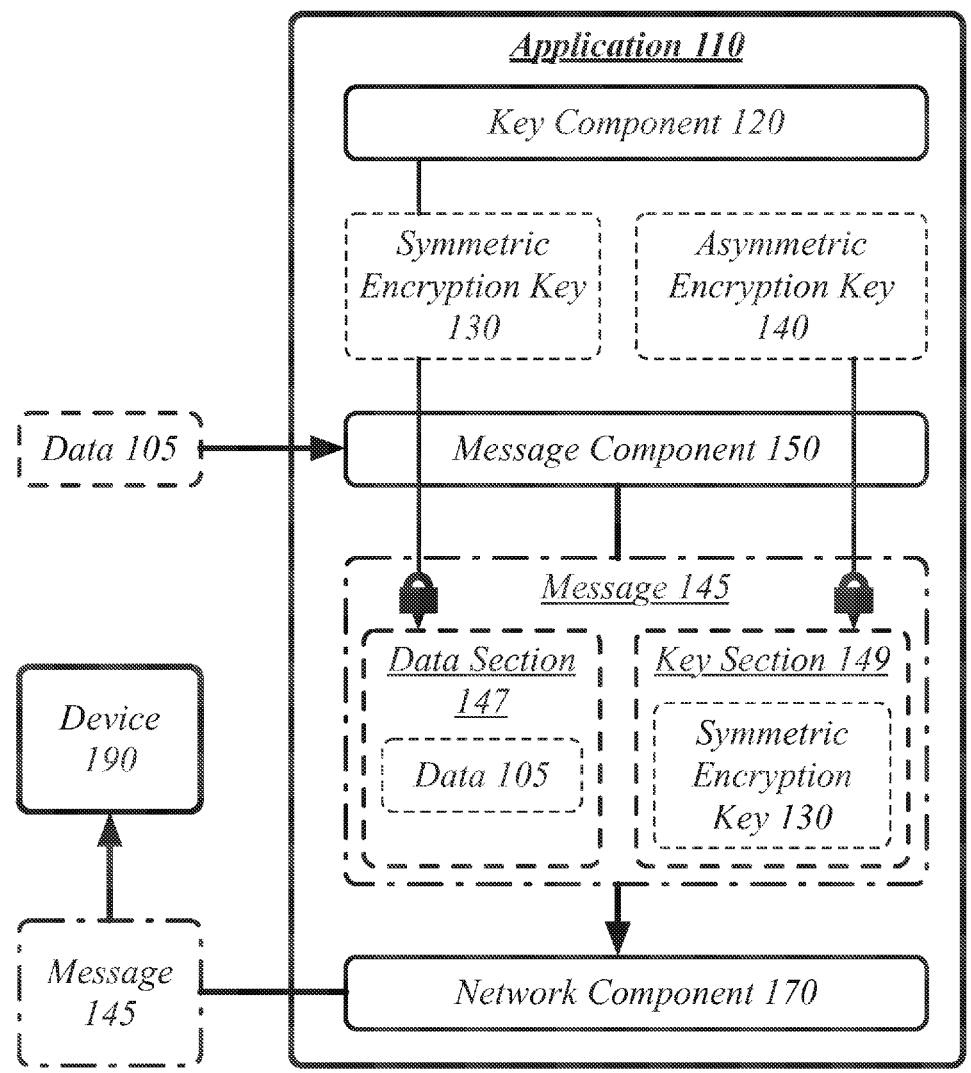
FIG. 1 illustrates an embodiment of an encryption system.

Various embodiments are directed to techniques for handshake-free encrypted communication. Some embodiments are particularly directed to techniques for handshake-free encrypted communication which leverages an ongoing communications relationship between two devices to cache exchanged encryption secrets and thereby avoid the handshake. Efficient encrypted communication relies on a shared secret between devices to ensure the security of the communications channel. By leveraging an ongoing relationship between devices, this shared secret may be cached on the devices thereby reducing the delay to engaging in encrypted communication.

Secure communication between two devices relies on one or more keys, typically one or more numbers, which are used as one or more variables in the mathematical transformations which are used to obscure the information being transferred between devices. In symmetric encryption schemes the same key is used to both encrypt and decrypt the communication. The key is a secret which will be shared between devices in order for them to communicate. Any party which knows the key will be able to decrypt the communication and able to encrypt counterfeit communication and as such letting the key become known by an untrusted party comprises the security of the communication. In asymmetric encryption schemes the encryption key used to encrypt the communication is different from the decryption key used to decrypt the communication. As such, a party which only knows the encryption key cannot decrypt the communication, and a party which only knows the decryption key cannot counterfeit communication. Often, a party will generate a pair of keys, either of which may be used as an encryption or decryption key, where if one is used to encrypt the other is used to decrypt. One of these keys will be published, known as the public key, while the other is kept private, known as the private key. If the public key is used to encrypt, only the party or parties which know the private key may decrypt. If the private key is used to encrypt, any party can decrypt with the knowledge that the party with the private key must have performed the encryption.

Because an asymmetric encryption scheme allows a message to be encrypted with a public key it is a convenient method for initiating encrypted communication. The party initiating the communication can use the public key to encrypt an opening message to the party with the private key and only the party with the private key can decrypt it. Unfortunately, asymmetric encryption schemes tend to be more computationally expensive than the symmetric encryption schemes and tend to be more complex to implement. As such, it is desirable to use symmetric encryption for the bulk of the communication between two parties. However, a symmetric key exchanged over an unencrypted channel may not be secret, and therefore should not be trusted to encrypt communication between two parties. Consequently, asymmetric encryption keys may be used to bootstrap to the use of a symmetric encryption key to secure communication.

For instance, with the Secure Sockets Layer (SSL) or Transport Layer Security (TLS) used as part of the Hypertext Transfer Protocol Secure (HTTPS) for transmitting secure Hypertext Markup Language (HTML) pages, a four-message handshake is performed: the client transmits to the server a "hello" message, the server responds with a certificate containing the server's public asymmetric encryption key, the client uses the public asymmetric encryption key to encrypt a secret symmetric encryption key and transmit it to the server, and the server responds by acknowledging the receipt of the symmetric encryption key. With that four-step process complete, a secure channel is created, a request for a web page may be transmitted from the client to the server, and the server may respond with the web page, the request and the responding web page encrypted using the established secret symmetric encryption key.

Unfortunately, this handshake process delays the initiating of the desired communication. In the example regarding HTTPS, the request for a web page and response is delayed until four messages are exchanged between the client and the server. In some circumstances, these four messages may be able to be exchanged rapidly enough that a user of the client device may not notice the delay. For instance, if a user clicks on a link on a web page, initiating a request for a new web page, if the client and server are able to perform the handshake process sufficiently quickly then the user may not be able to perceive an appreciable delay in the process of requesting and receiving a web page. However, in some circumstances the exchange of even brief messages may involve sufficient delay that including additional messages for a handshake beyond those used for the primary request-and-response may use sufficient time as to be appreciable by the user. In particular, the long round-trip times of cellular data networks may result in handshakes taking considerable time. Devices using a cellular data network to communicate may use sufficient time for the transmission of each message that the delay caused by the four-step handshake process may be noticeable to the user, thereby degrading their experience. As such, it may be desirable to eliminate the handshake process in establishing a secure channel.

Similarly, some communication protocols, such as the Transmission Control Protocol (TCP) may themselves use a handshake process to be established. A stateful protocol is one which relies on an established communication state between the two parties communicating to carry out the communication. A stateful protocol, such as TCP, may use a handshake process to establish that state prior to the communication of message data may be initiated. For example, TCP involves a three-step handshake: the client sends a message to the server requesting the initiation of a TCP channel, the server responds with an acknowledgement of the request, and the client responds with an acknowledgement of the acknowledgement. In contrast, a stateless protocol, such as the User Datagram Protocol (UDP), does not depend on state and does not use a handshake to build a channel prior to communication. The first message sent from a client to a server using a stateless protocol contains message data rather than merely being part of a handshake process prior to the transmission of message data. However, because stateless protocols do not typically include support for confirmed delivery, they are considered less reliable and inappropriate for the full request-and-response interaction. In particular, in situations where a request may use only a small amount of data, but the response may use a large amount of data—such as in request and response for a web page—a stateless protocol may be inappropriate for the transmission of the large amount of data comprising the response: without the guaranteed-delivery of a stateful protocol portions of the response data may be lost. As such, it may be desirable to eliminate the handshake process for transmitting a request for a web page from a client to a server, but to use the handshake process for the reply containing the web page from the server to the client.

In general, therefore, it may be desirable to eliminate handshakes where possible to reduce the delay in communication, particularly on mobile devices. As a result, the embodiments can improve the user experience for encrypted communication, particularly on mobile networks which may have long round-trip-times and therefore large delays for request-response communication.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

FIG. 1 illustrates a block diagram for a encryption system 100. In one embodiment, the encryption system 100 may comprise a computer-implemented encryption system 100 having a software application 110 comprising one or more components. Although the encryption system 100 shown in FIG. 1 has a limited number of elements in a certain topology, it may be appreciated that the encryption system 100 may include more or less elements in alternate topologies as desired for a given implementation.

The encryption system 100 may comprise the application 110. The application 110 may be generally arranged to perform encryption on behalf of itself or other applications. It will be appreciated that the application 110 may not comprise a stand-alone application, but instead a module, library, or other programming unit that may incorporated into or remain external to other applications and either internally or externally provide encryption services to other applications or to the application in which it is embedded. The application 110 may be generally operative to receive data 105 for transmission to a device 190 and to encrypt the data 105 prior to transmission so as to secure the data 105 from eavesdropping or spoofing during the transmission to device 190. The application 110 may comprise a key component 120, a message component 150, and a network component 170. Data 105 may comprise any computer data for transmission to device 190.

The application 110 may comprise a key component 120 operative to generate and manage keys on behalf of the application 110. The key component 120 may be operative to generate a symmetric encryption key 130. The symmetric encryption key 130 may correspond to an encryption key for a particular encryption scheme, the symmetric encryption key 130 generated according to a predefined procedure for generating encryption keys for that particular encryption scheme. The symmetric encryption key 130 may be randomly generated, said random generation part of the predefined procedure for generating encryption keys for an encryption scheme. For instance, symmetric encryption key 130 may comprise one or more numbers, wherein the encryption scheme indicates particular requirements for the one or more numbers, the one or more numbers randomly generated without the constraints of the requirements of the encryption scheme. Random numbers may be generated according to any of the known techniques for generating random numbers, including any pseudo-random or truly-random techniques appropriate for the generation of cryptographic keys.

The application 110 may comprise a message component 150, the message component operative to construct a message 145, the constructed message 145 comprising a key section 149 and a data section 147, the key section 149 encrypted using an asymmetric encryption key 140 and comprising the symmetric encryption key 130, the data section encrypted using the symmetric encryption key 130 and comprising the data 105. Message 145 may comprise a concatenation, combination, or any other unification of data section 147 and key section 149 into a single message 145. Key section 149 may comprise a header of message 145 and data section 147 a body of message 145. Alternatively, message 145 may comprise a separate header from data section 147 and key section 149, this header indicating that the message 145 is encrypted according to the described dual-key scheme so as to inform device 190 of the necessary technique for decryption message 145.

Asymmetric encryption key 140 may comprise an asymmetric encryption key 140 known by application 110 to be an asymmetric encryption key 140 wherein the corresponding decryption key is a secret maintained by device 190 or accessible to device 190. In general, asymmetric encryption key 140 may comprise an asymmetric encryption key 140 appropriate for transmitting secure messages to device 190. Because device 190 is capable of decryption a key section 149 encrypted using asymmetric encryption key 140, device 190 is therefore capable of retrieving symmetric encryption key 130 from key section 149 and thereby decoding data section 147 to retrieve data 105. Because the partner key to asymmetric encryption key 140 is not generally available, however, an eavesdropper on the transmission of message 145 from application 110 to device 190 would not be able to decode the key section 149, would therefore not be able to retrieve the symmetric encryption key 130 from the key section 149, and would therefore not be able to decryption data section 147 and retrieve data 105. Therefore, application 110 is operative to encode the data 105 of message 145 using a symmetric encryption key 130 and securely transmit the data 105 to device 190, with device 190 operative to access the data 105 using symmetric encryption key 130 despite not being previously aware of the value of symmetric encryption key 130.

In some embodiments, the message 145 may comprise a timestamp, the timestamp comprising a time the message 145 was generated, the timestamp indicating the beginning of a validity period for the message 145. For instance, the timestamp may be included in the key section 149 so that the validity of message 145 may be determined immediately upon decrypting key section 149 using the asymmetric encryption key 140. In some embodiments, if the received message 145 is an HTTP message, the timestamp may be included in an HTTP header of the message 145. The timestamp comprising a time the message 145 was generated may correspond to the time the key section 149 was encrypted, the time to the data section 147 was encrypted, the time the message component 150 received data 105 or symmetric encryption key 130, or any other time suitable for indicating the start of a valid period for message 145. The timestamp may correspond to an internal time of application 110 or a device executing application 110, or may correspond to an estimated current time for device 190, such as may be generated by application 110 determining a clock offset for device 190 and applying the clock offset to a current time available to application 110.

As such, the message component 150 may be operative to correct for any disagreement between application 110 and device 190 as to the current time. The device 190 may be operative to compare the timestamp to a current time for device 190 and to determine whether the current time falls within a validity period extending from the received timestamp to a predefined interval after the current time. For example, device 190 may used a predefined interval of five minutes, such that a received message 145 is valid if it is received by device 190 at a current time within the span of time between the timestamp and five minutes after the timestamp. As such, the timestamp may be operative to prevent replay attacks on device 190, such as where a message 145 is resent by an eavesdropper in order to spoof the identity of application 110.

The application 110 may comprise a network component 170 operative to transmit the message 145 to the device 190. Transmitting the message 145 to the device 190 may comprise any of the known techniques for transmitting a message to a device, such as by transmitting the message 145 using the UDP or TCP protocols over the Internet.

Figure 2:
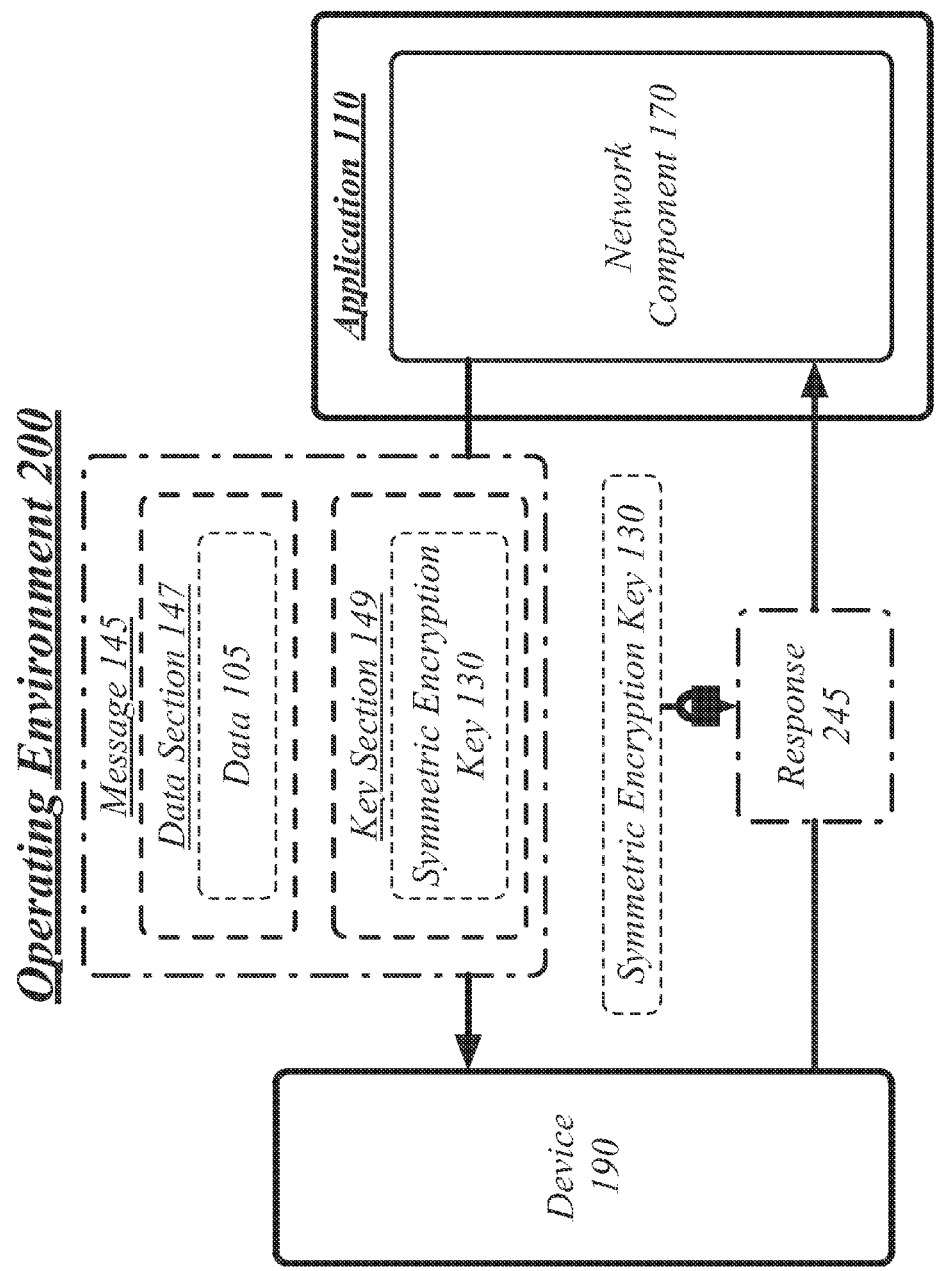
FIG. 2 illustrates an operating environment of the encryption system that includes a response to a sent message.

FIG. 2 illustrates an embodiment of an operating environment 200 for the encryption system 100. As shown in FIG. 2, the interaction between application 110 and device 190 may further include a response 245 received by network component 170 from device 190, the response 245 corresponding to the device 190 replying to the message 145 from application 110.

As such, in some embodiments, the network component 170 may be operative to receive a response 245 to the message 145 from the device, the response 145 encrypted using the symmetric encryption key 130. Device 190 gains knowledge of symmetric encryption key 130 via the reception of message 145 containing symmetric encryption key 130. Device 190 may therefore be operative to cache symmetric encryption key 130 during the preparation of response 245 in order to use it for the encryption of response 245. As symmetric encryption key 130 was protected by asymmetric encryption key 140 during the transmission from application 110 to device 190, symmetric encryption key 130 comprises a shared secret between application 110 and device 190 and is therefore suitable for use in securing the response 245.

The response 245 may comprise a response 245 calculated based on data 105 received as part of the reception of message 145. Response 245 may comprise any sort of possible response 245 to data 105 and may be determined according to any known technique for responding to messages.

Message component 150 may be operative to receive response 245 from network component 170, to retrieve symmetric encryption key 130 from key component 120, and to decrypt response 245 using symmetric encryption key 130. Message component 150 may then be operative to pass the decrypted contents of response 245 to another application, module, or other programming element, such as the programming element responsible for sending data 105 to message component 150. Application 110 may therefore be operative to manage the encryption of both data 105 sent to device 190 as part of message 145 and the decryption of the response 245 received from device 190.

Figure 3:
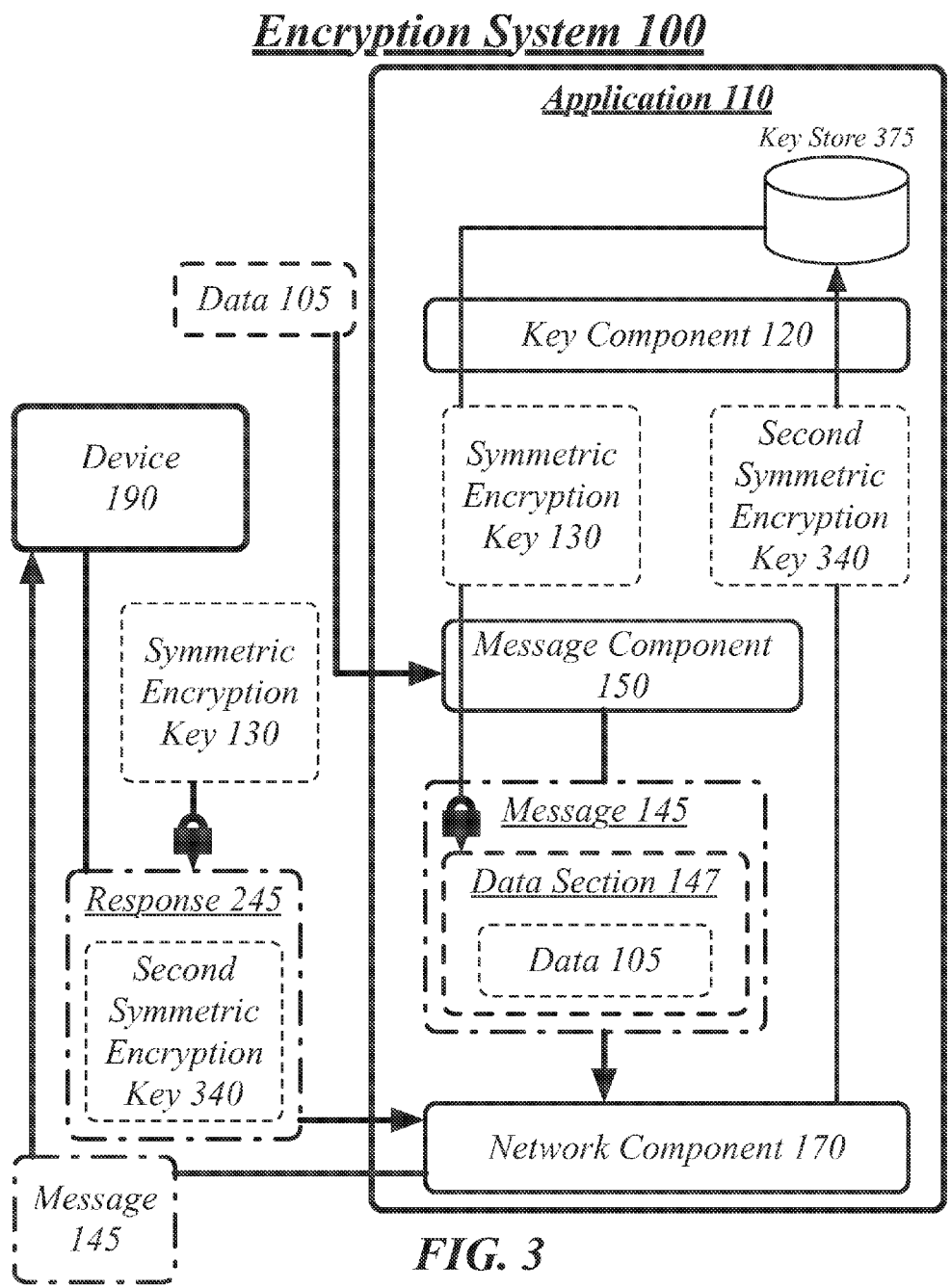
FIG. 3 illustrates a second embodiment of the encryption system in which only symmetric encryption keys are used in the encryption of the message.

FIG. 3 illustrates a second block diagram for the encryption system 300. In the illustrated second block diagram application 110 is operative to receive data 105 for transmission to a device 190 and to encrypt the data 105 prior to transmission so as to secure the data 105 from eavesdropping or spoofing during the transmission to device 190, the encryption of message 145 and its response 245 performed entirely using symmetric encryption keys without the use of asymmetric encryption keys. If the device 190 has no knowledge of symmetric encryption key 130 then for device 190 to be able to decrypt message 145 which contains elements encrypted by symmetric encryption key 130, symmetric encryption key 130 must be transmitted to device 190. However, if symmetric encryption key 130 has already been established and shared between application 110 and device 190, then symmetric encryption key 130 can be used as the sole encryption key for the transmission of data 105, eliminating the use of asymmetric encryption key 140. As such, in some embodiments, application 110 and device 190 may be operative to use asymmetric encryption key 140 to bootstrap to shared knowledge of symmetric encryption keys when such shared knowledge has not previously been established, and may be operative to not use asymmetric encryption key 140 and instead rely solely on shared knowledge of symmetric encryption keys when such shared knowledge has been previously established, such as during a previous communication with the device 190.

The application 110 may comprise the key component 120, the key component 120 operative to retrieve a first symmetric encryption key 130 from a key store 375. While in some embodiments, the symmetric encryption key 130 may be generated by key component 120, in other embodiments the symmetric encryption key 130 may have been previously generated and stored in key store 375 for later retrieval. For instance, symmetric encryption key 130 may have been established during a previous communication between device 190 and application 110, symmetric encryption key 130 cached in key store 375 for use in encrypting the current communication. The symmetric encryption key 130 may be retrieved from key store 375 using an identifier corresponding to device 190 and/or the sender of data 105, so as to allow for the retrieval of the appropriate symmetric encryption key 130 for sending to a particular device 190 or from a particular sender.

The application 110 may comprise the message component 150 operative to construct the message 145 comprising the data section 147, the data section 147 encrypted using the first symmetric encryption key 130. As device 190 already has knowledge of symmetric encryption key 130, this embodiment does not rely on a key section 149 for transmitting the symmetric encryption key 130, and as such does not rely on asymmetric encryption key 140. As symmetric encryption key 130 may have been previously established for use in a future communication, wherein the transmission of data 105 comprises that future communication, the encryption of data section 147 with symmetric encryption key 130 may comprise the first use of symmetric encryption key 130 by either application 110 or device 190 for encrypting communication between the two.

In some embodiments, the message 145 may comprise a timestamp, the timestamp comprising a time the message 145 was generated, the timestamp indicating the beginning of a validity period for the message 145. The timestamp may be included in the data section 147 so that the validity of message 145 may be determined immediately upon decrypting data section 147 using the symmetric encryption key 130.

The application 110 may comprise the network component 170 operative to transmit the message 145 to the device 190. Transmitting the message 145 to the device 190 may comprise any of the known techniques for transmitting a message to a device, such as by transmitting the message 145 using the UDP or TCP protocols over the Internet.

The network component 170 may be operative to receive a response 245 to the message, the response comprising the second symmetric encryption key 340. The second symmetric encryption key 340 may have been generated by device 190 for use in a future communication between application 110 and device 190. The second symmetric encryption key 130 may be generated by device 190 using any of the known techniques for generating an encryption key, such as may be appropriate for the particular encryption scheme used for communication between device 190 and application 110. The received response 245 may be encrypted using the first symmetric encryption key 130, the message component 150 operative to retrieve symmetric encryption key 130 from the key component 120 and to decrypt the message 145 using the symmetric encryption key 130.

The key component 120 may therefore be operative to store the second symmetric encryption key 340 in the key store 375. The second symmetric encryption key 340 may be stored in the key store 375 with an identifier associated with the device 190 and/or a sender of data 105, so as to allow for the retrieval of second symmetric encryption key 340 for sending to a particular device 190 or from a particular entity.

Figure 4:
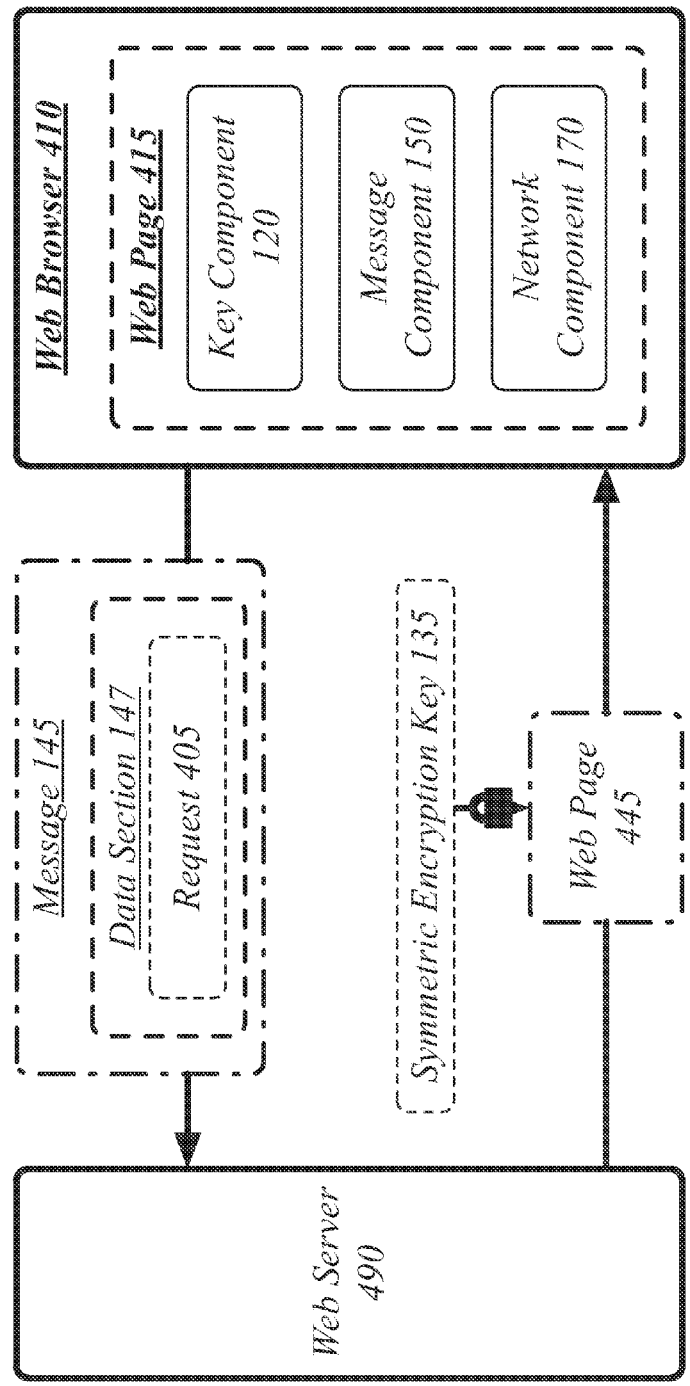
FIG. 4 illustrates an operating environment of the encryption system wherein a request and response is performed with a web server.

FIG. 4 illustrates an embodiment of an operating environment 400 for the encryption system 100. As shown in FIG. 4, application 110 may comprise a web browser 410 and device 190 may comprise a web server 490, the web browser 410 engaging in a request-and-response with the web server 490.

A web browser 410 may engage in a request-and-response with a web server 490. In typical Hypertext Transport Protocol (HTTP) or Hypertext Transport Protocol Secure (HTTPS) interactions, the interaction is stateless in that each request 405 for a web page sent from a web browser 410 to the web server 490 and corresponding responding web page 445 sent from web server 490 to web browser 410 is an independent action from other web page requests. The web server 490 is generally not expected to maintain state once web page 445 has been sent to the web browser 410. Some online services may maintain user state, device state, or other state for use in generating web page 445, said state stored on or accessible to web server 490, or stored by or accessible to web browser 410. However, such state typically reflects an ongoing relationship between a user and a server, and does not reflect network state being maintained for the request of web pages. As such, the message 145 may comprise a data section 147, wherein the data section 147 comprises a request 405 to receive a web page 445 from the web server 490, the received response 245 comprising the web page 445, the response 245 and therefore the web page 445 encrypted using symmetric encryption key 135.

In some embodiments, the message 145 may comprise a hypertext transfer protocol (HTTP) request 405, the HTTP request 405 comprising an empty HTTP header and an HTTP body. Typically the header of a HTTP request would include the URL for the web page 445 being requested, where if the URL is to be obscured the entire HTTP request 405 would be encrypted, such as by using TLS with HTTPS. However, the HTTP header may instead be left empty with the URL stored in the HTTP body, the HTTP body encrypted, but the HTTP header left unencrypted. The web server 490 may therefore be operative to decrypt the HTTP body to collect the HTTP request 405, the HTTP request 405 stored in the HTTP body corresponding to the HTTP header that would have been sent in a conventional HTTPS scenario.

In some embodiments, the HTTP body may comprise a data section 147, the data section 147 encrypted using the symmetric encryption key 130, the data section 147 comprising the HTTP request 405 for web page 445. In some embodiments, the HTTP body may also comprise the key section 149, such as where asymmetric encryption key 140 is being used to encrypt symmetric encryption key 130. In general, the web server 490 may be operative to decrypt the data section 147 using symmetric encryption key 130 and to compute the response to the decrypted data section 147 or some portion of decrypted data section 147 as if request 405 were a conventional HTTP request 405. As such, the described embodiments may comprise an alternative to HTTPS wherein both the HTTP request 405 and the responding web page 445 are encrypted, but without the TLS handshake process creating a delay before the reception and processing of request 405.

In some embodiments, the web browser 410 may execute, render, or otherwise display a web page 415, the key component 120, the message component 150, and the network component 170 embedded in the web page 415 for execution by the web browser 410. The key component 120, message component 150, and network component 170 may comprise Java™ components, JavaScript™ components, Microsoft® Silverlight™ components, or any other form of component appropriate for embedding in a web page 415. The component embedded in the web page 415 may be operative to perform the encryption and decryption of HTTP request 405 and web page 445 on behalf of a user of web browser 410, thereby securing their communication with web server 490.

Figure 5:
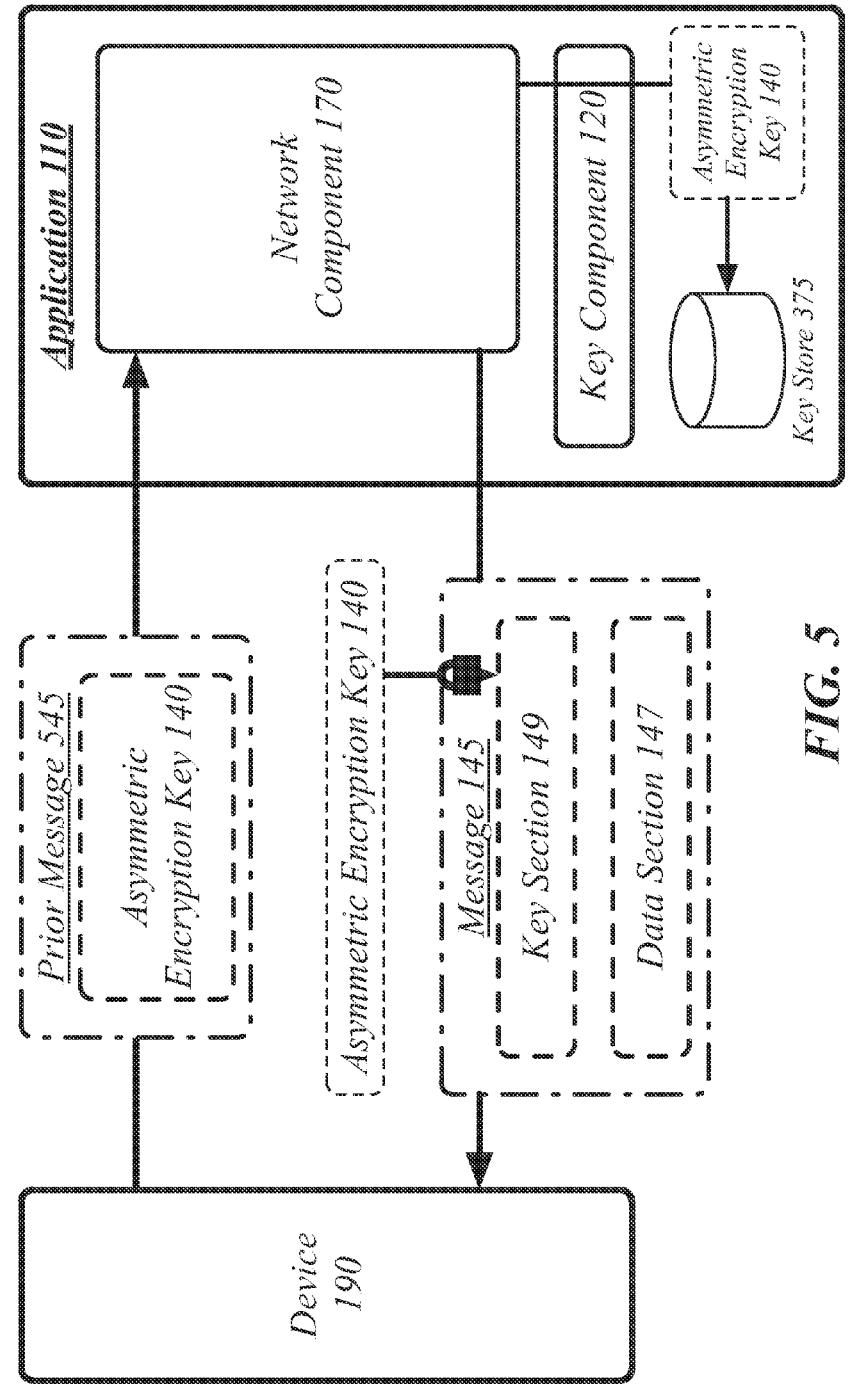
FIG. 5 illustrates an operating environment of the encryption system that includes a prior message being received containing an asymmetric encryption key.

FIG. 5 illustrates an embodiment of an operating environment 500 for the encryption system 100. As shown in FIG. 5, the application 110 has received a prior message 545 from device 190.

In some embodiments, the network component 170 may be operative to receive a prior message 545 from device 190, the prior message 545 comprising the asymmetric encryption key 140. The device 190 may transmit the asymmetric encryption key 140 to application 110 when the asymmetric encryption key 140 is not currently stored by or accessible to application 110 or when a previous stored asymmetric encryption key associated with device 190 has expired. Similarly, the application 110 may be operative to request asymmetric encryption key 140 from device 190 when the asymmetric encryption key 140 is not currently stored by or accessible to application 110 or when a previous stored asymmetric encryption key associated with device 190 has expired.

In some embodiments, prior message 545 may comprise a response to a specific request for the asymmetric encryption key 140, such as a request from application 110 to device 190 for its public asymmetric encryption key, the prior message 545 solely communicating the asymmetric encryption key 140. Alternatively, where the application 110 is not currently storing or does not currently have access to asymmetric encryption key 140 it may use a conventional HTTPS request-and-response, including the TLS handshake, to request and receive a web page. This conventional HTTPS request-and-response may include as part of the TLS handshake the reception of asymmetric encryption key 140, such as in a security certificate. It will be appreciated that as a public asymmetric encryption key, such as asymmetric encryption key 140, is not secret, that encryption used during the transmission of asymmetric encryption key 140 from the device 190 to the application 110 may be used to ensure that the asymmetric encryption key 140 is received from device 190 rather than used to maintain secrecy of the asymmetric encryption key 140. As such, the application 110 may be operative to construct an HTTPS connection to the device 190 and request the asymmetric encryption key 140 using the HTTPS connection. The key component 120 may therefore be operative to cache in the key store 375 an asymmetric encryption key 140 received as part of a HTTPS or TLS exchange for use in a future encrypted exchange which does not use HTTPS or TLS.

The key component 130 may be operative to invalidate the asymmetric encryption key 140 in the key store 375 after the expiration of a validity period associated with the asymmetric encryption key 140. Either the device 190 or the application 110 may specify a validity period for the asymmetric encryption key 140 after which the asymmetric encryption key 140 should not be used. This may serve to prevent outdated keys from being used in communication, which may serve to increase the security of communication as the validity period may represent, for example, an amount of time during which a compromised asymmetric encryption key 140 may still be used by applications to encrypt their communication.

Figure 6:
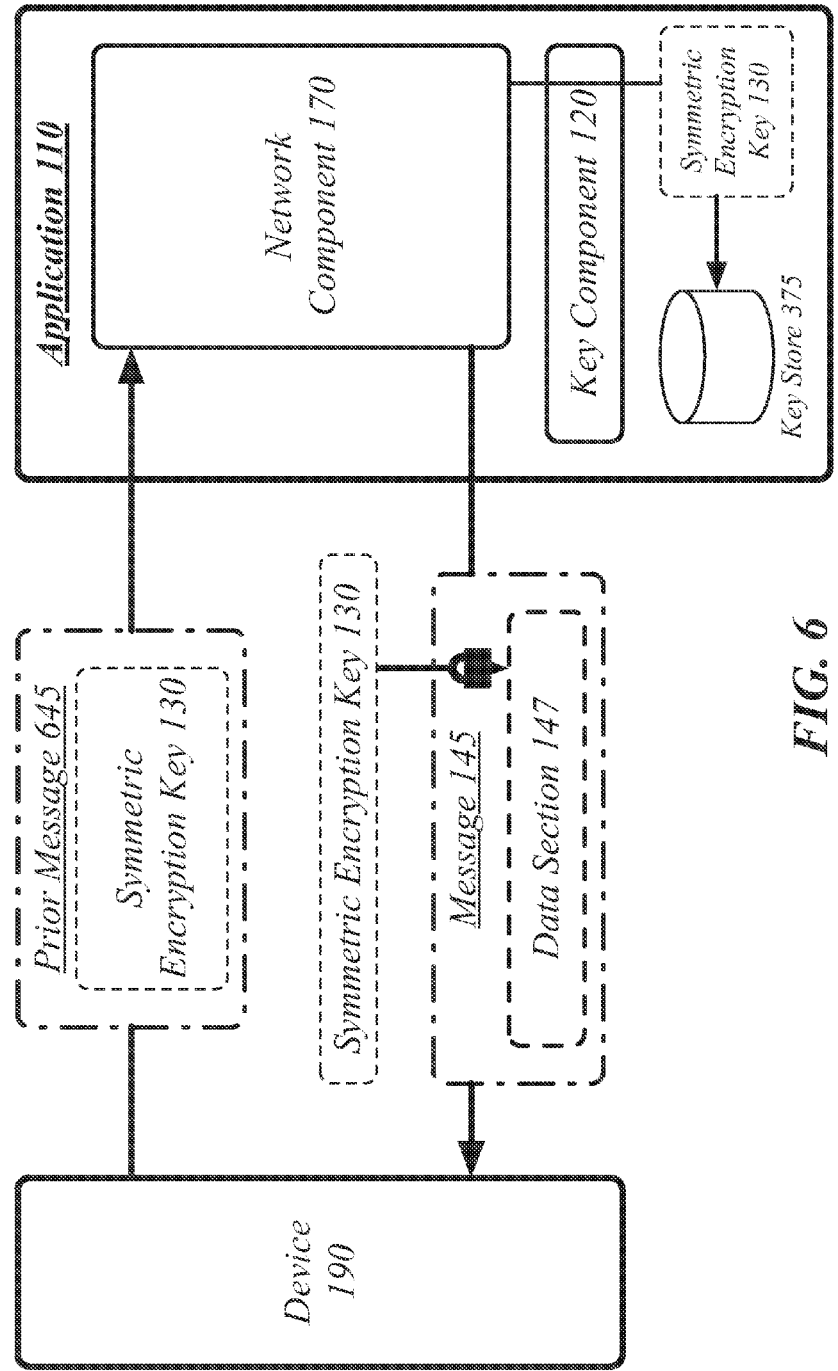
FIG. 6 illustrates an operating environment of the encryption system in which a prior message is received containing a symmetric encryption key.

FIG. 6 illustrates an embodiment of an operating environment 600 for the encryption system 100. As shown in FIG. 6, the application 110 has received a prior message 645 from device 190.

In some embodiments, the network component 170 may be operative to receive a prior message 645 from device 190, the prior message 645 comprising the symmetric encryption key 130. The device 190 may transmit the symmetric encryption key 130 to the application 110 as part of a response to a previous message or request sent by application 110 to device 190. The key component 120 may be operative to store the symmetric encryption key 130 in the key store 375.

The key component 130 may be operative to invalidate the symmetric encryption key 130 in the key store 375 after the expiration of a validity period associated with the symmetric encryption key 130. Either the device 190 or the application 110 may specify a validity period for the symmetric encryption key 130 after which the symmetric encryption key 130 should not be used. This may serve to prevent outdated keys from being used in communication, which may serve to increase the security of communication as the validity period may represent, for example, an amount of time during which a compromised symmetric encryption key 130 may still be used by application 110 to encrypt its communication with device 190.

Figure 7:
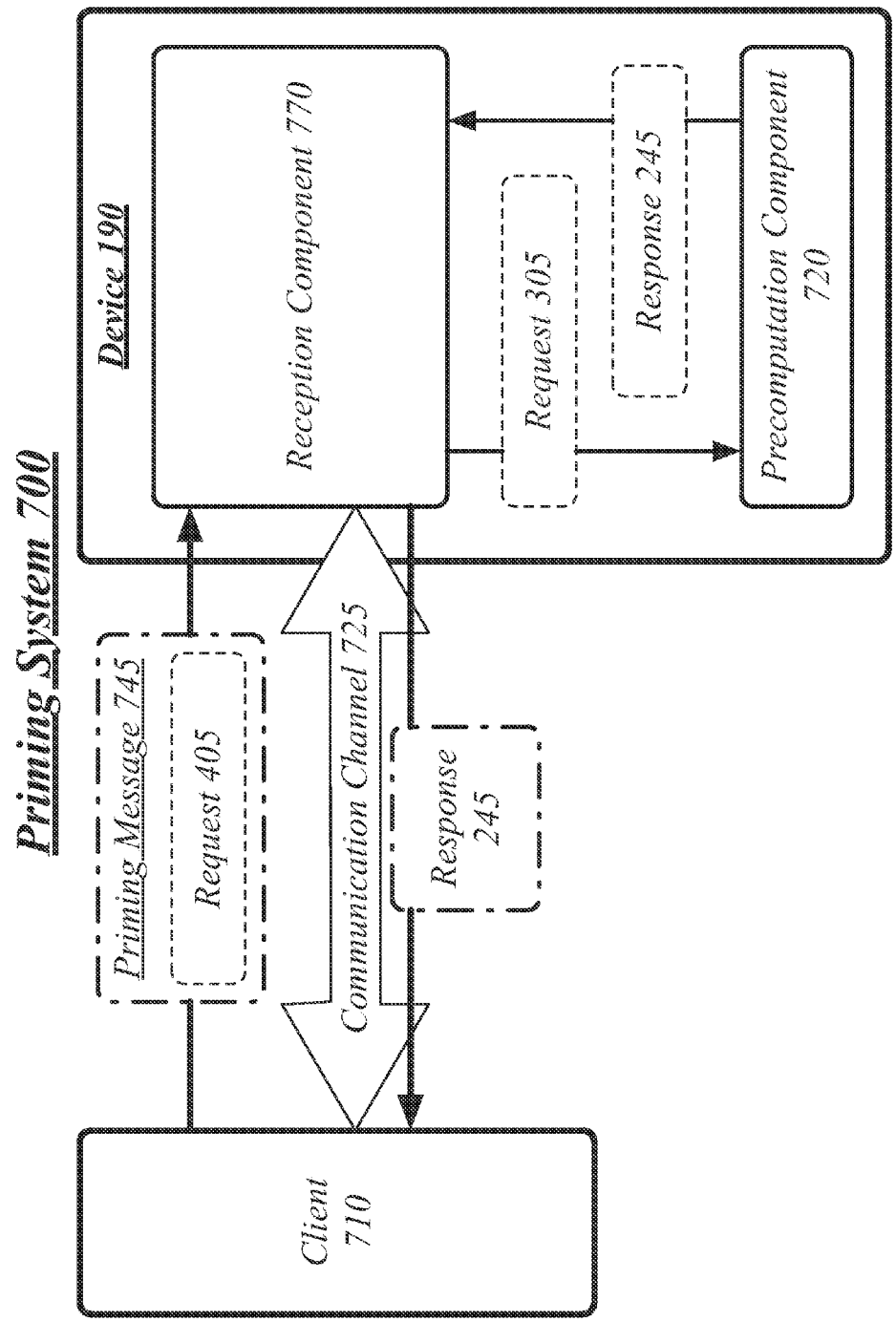
FIG. 7 illustrates an embodiment of a priming system.

FIG. 7 illustrates a block diagram for a priming system 700. In one embodiment, the priming system 700 may comprise a computer-implemented priming system 700 comprising one or more components. Although the priming system 700 shown in FIG. 7 has a limited number of elements in a certain topology, it may be appreciated that the priming system 700 may include more or less elements in alternate topologies as desired for a given implementation. The priming system 700 may comprise the device 190. The device 190 may be generally arranged to receive a priming message 745 comprising a request 405, to precompute a response 245, and to transmit the response 245 once a secure communication channel 725 is established. The device 190 may comprise a reception component 770 and a precomputation component 720. It will be appreciated that while device 190 is depicted as a single, contained entity, that it may comprise a plurality of computing devices, such as a server cluster, cloud computing cluster, or any other distributed computing system. The priming system 700 may comprise client 710, which may comprise a computing device, software platform, or other computing entity. In some embodiments, client 710 may comprise, execute, or otherwise be associated with application 110.

Device 190 may comprise a reception component 770, the reception component 770 operative to receive a priming message 745 from a client 710 using a stateless network protocol, to establish a communication channel 725 to the client 710, and to transmit a response 245 to the priming message 745 over the communication channel 725 to the client 710. The priming message 745 may comprise a request 405, such as a HTTP request 405 for a web page 445.

A stateless protocol may comprise a protocol operative to engage communication without pre-established state or operative to engage communication without a handshake. The reception component 770 may be operative to receive the priming message 745 from client 710 without having established a communication channel with client 710, the priming message 745 received over a network independent of any pre-established communication channel. In some embodiments, the stateless network protocol may comprise the user datagram protocol (UDP).

The communication channel 725 may comprise a stateful communication channel 725 and may comprise a communication channel 725 which uses a handshake to establish connectivity between the client 710 and reception component 170. In some embodiments, the communication channel 725 may comprise a transmission control protocol (TCP) channel. The reception component 770 may be operative to carry out a handshake process, such as a TCP handshake process, to establish the communication channel 725 during the determination of a response to request 405. In various embodiments, either client 710 or reception component 770 may initiate the establishment of communication channel 725, such as through the sending of a TCP "hello" or SYN message.

Device 910 may comprise a precomputation component 720 operative to determine the response 245 in response to the reception of the priming message 745 from the client 710. Where the priming message 745 comprises a request 405, the response 245 to priming message 745 may comprise a response 405 to request 405. For example, if device 190 comprises a web server 490, then request 405 may comprise an HTTP request 405 for a web page 445, the web page 445 contained within response 245. The precomputation of response 245 may therefore comprise the preparation of web page 445 based on request 405. This preparation of web page 445 may comprise fetching stored content, calculating dynamic content, or any other task associated with the preparation of a web page 445 by a web server 490 using any known technique for determining a web page 445.

In some embodiments, device 190 may comprise a web server 490 for a social networking service. As such, the request 405 may comprise a request 405 for a web page 445 for the social networking service, the response 245 the web page 445 containing information from the social networking service. For example, a user may request a web page containing social networking information, such as a friends list, a news feed, event information, friend information, or any other social networking information. This social networking information may take appreciable time to fetch, calculate, or otherwise prepare. By receiving priming message 745 prior to a potentially-lengthy handshake process, precomputation component 720 may initiate preparation of web page 445 in advance of the handshake being completed, thereby reducing the delay between a user of client 710 requesting a social networking web page 445 and receiving the requested web page 445.

Figure 8:
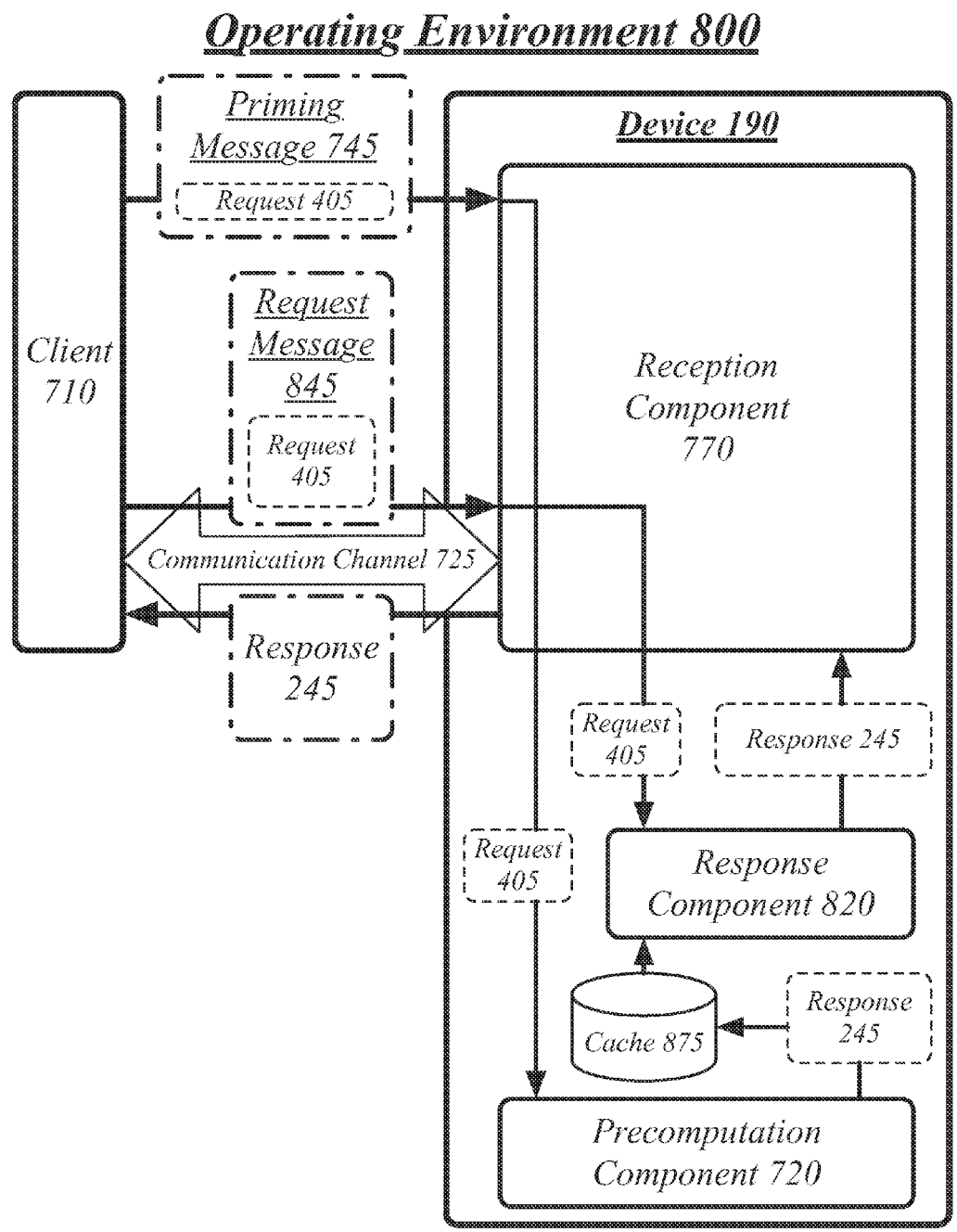
FIG. 8 illustrates an embodiment of the priming system including a response component.

FIG. 8 illustrates an embodiment of an operating environment 800 for the priming system 700. As shown in FIG. 8, the device 190 includes a response component 820.

In some embodiments, the determined response 245 to a request 405 may be cached in a cache 875 between being determined and being sent to the client 710. As such, the precomputation component may be operative to store the determined response 245 in a cache 875. In some embodiments, the determined response 245 may be stored in cache 875 according to the identifier. The identifier may be received by the reception component 770 as part of priming message 745, the identifier included in the priming message 745 to identify a request-and-response session for request 405.

The device 190 may comprise a response component 820 operative to retrieve the determined response 245 from the cache 875 in response to the reception component 770 establishing the communication channel 725 and to transmit the response 245 to the reception component 770 for transmission to the client 710. The response 245 may be retrieved from the cache 875 according to the identifier associated with the response 245.

It will be appreciated that as the priming message 745 is transmitted from the client 710 to the reception component 770 using a stateless network protocol that there is no guarantee that the priming message 745 will be received by device 190. As such, the client 710 may be operative to initiate the establishment of communication channel 725 immediately following or in parallel to the sending of priming message 745, the client 710 initiation the creation of communication channel 725 rather than waiting for a response from device 190 in recognition that device 190 may never receive priming message 745 and therefore not respond. Once communication channel 725 is established, client 710 may be operative to transmit request message 845 to reception component 770 over communication channel 725, request message 845 comprising request 405. This ensures that even if device 190 didn't receive priming message 745, that once communication channel 725 is established that device 190 has request 405. If device 180 receives request 405 prior to the establishment of communication channel 725 it can begin precomputation of the response 245. If not, the calculation and return of response 245 can proceed as quickly as if no priming message 745 were attempted.

Therefore, the reception component 770 may be operative to receive a request message 845 from the client 710 over the communication channel 725. The request message 845 may comprise request 405 identical to the request 405 received as part of priming message 745. In some embodiments, the response component 820 may be operative to verify that the request message 845 corresponds to the priming message 745 prior to transmitting the response 245 to the reception component. For instance, priming message 745 may include an identifier for request 405, the identifier used to store and retrieve the request 405 from cache 875. The reception component 770 may be operative to pass the identifier for request 405 to response component 820.

Upon receiving the identifier for request 405 from reception component 770, the response component 820 may be operative to query the cache 875 to determine whether a response 245 to request 405 has been stored in the cache 875. If response component 820 determines that the cache 875 has a cached response 245, it will retrieve the response 245 and forward it to reception component 770 for transmission to client 710. However, if response component 820 determines that the cache 875 does not have a cached response 245 stored it may initiate the computation of response 245 by precomputation component 720 or by another component of device 190.

Response component 820 may be operative to delay until a response 245 is ready for forwarding to reception component 770 and transmission to client 710. In some embodiments, if the calculation of response 245 were initiated in response to priming message 745 but not completed before the reception of the identifier for request 405 by the response component 820, the response component 820 may be operative to initiate the computation of response 245 in parallel to the precomputation of response 245 and to return whichever calculation of response 245 returns first to reception component 770 for transmission to the client 710. In various embodiments, this may comprise the response component 820 periodically polling the cache 875, subscribing to a notification of an entry of response 245 into the cache 875, or any other method of making response component 820 operative to receive a computed response 245 as soon as it is completed by a computation component or precomputation component 720.

Alternatively, once the calculation of response 245 is initiated in response to priming message 745, a lock may be placed on the calculation of response 245 to prevent duplication of effort. As such, upon receiving the identifier for request 405 from reception component 770, the response component 820 may be operative to query the cache 875 to determine whether the process of calculating a response 245 to request 405 has been started. If not, the response component 820 may be operative to initiate the computation of response 245. If so, the response component 820 may be operative to allow the existing calculation to complete without the initiation of a parallel calculation.

In some embodiments, the priming message 745, request message 845, and response 245 may be encrypted using one of the described encryption schemes. For instance, the priming message 745 may comprise a priming key section and a priming data section corresponding to a key section 149 and data section 147. The priming key section may be encrypted using the asymmetric encryption key 140 and comprise the symmetric encryption key 130, the priming data section encrypted using the symmetric encryption key 130. Similarly, the request message 845 may comprise a request key section and a request data section, the request key section encrypted using the asymmetric encryption key 140 and comprising the symmetric encryption key 130, the request data section encrypted using the symmetric encryption key 130. The priming key section may be the same as the request key section and the priming data section may be the same as the request data section. Whether or not the key and data sections are the same, the same symmetric encryption key 130 and asymmetric encryption key 140 may be used with both. Similarly, the symmetric encryption key 130 may be used to encrypt response 245 as previously described.

Alternatively, the request-and-response between the client 710 and the device 190 may avoid the use of asymmetric encryption keys. As previously described, the priming message 745 may be encrypted using a first symmetric encryption key 130, the response 245 encrypted using the first symmetric encryption key 130 and comprising a second symmetric encryption key 340. The reception component 770 may be operative to retrieve the first symmetric encryption key 130 from a key database according to the identifier received with priming message 745 or request message 845 and to determine the second symmetric encryption key 340 for transmission to client 710 for use in the next communication between client 710 and device 190. As such, the reception component 770 may be operative to receive a second priming message from the client 710, the second priming message encrypted according to the second symmetric encryption key 340. Similarly, the reception component 770 may be operative to receive a second request message from the client 710, the second request message encrypted according to the second symmetric encryption key 340. The reception component 770 may be operative to respond to the second priming message and second request message with a second response encrypted using the second symmetric encryption key 340.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Figure 9:
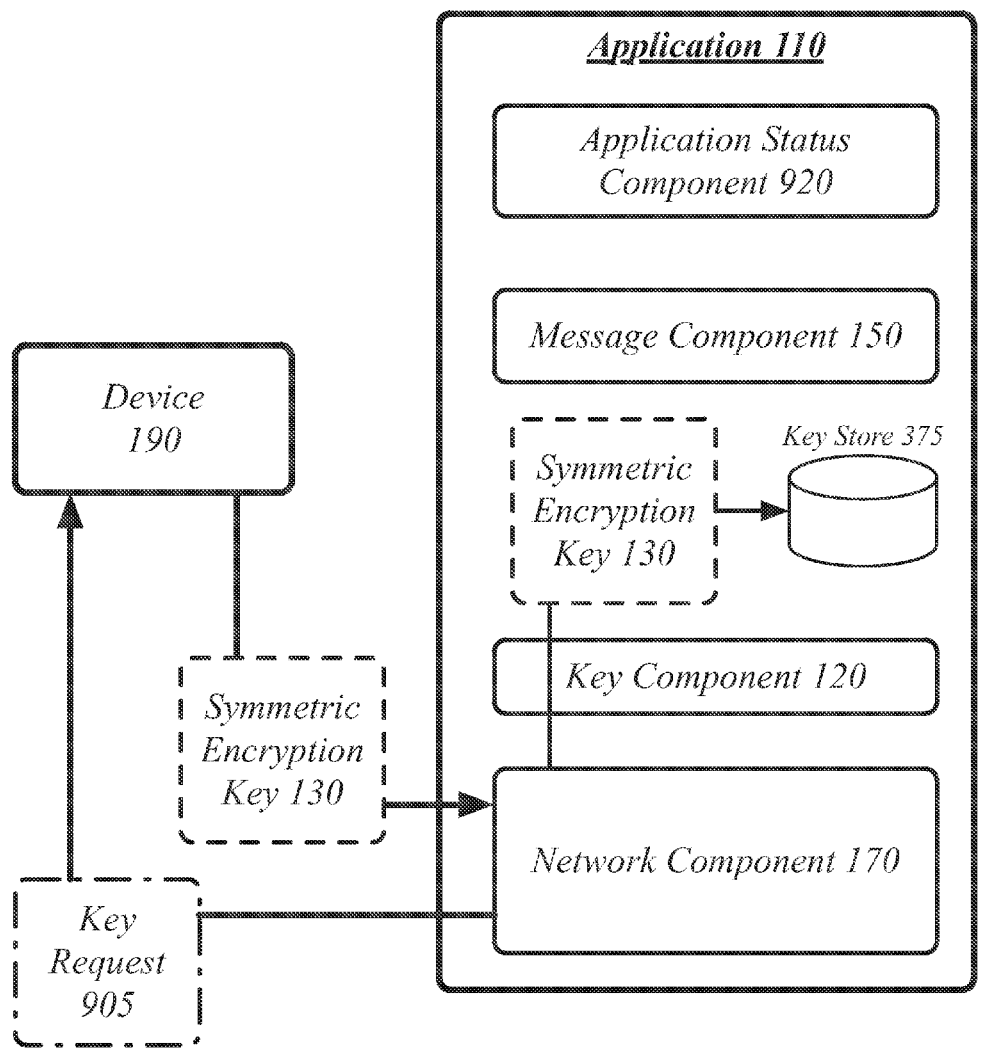
FIG. 9 illustrates an operating environment of the encryption system including an application status component.

FIG. 9 illustrates an embodiment of an operating environment 900 for the encryption system 100. As shown in FIG. 9, the application 110 includes an application status component 920.

An application 110 may have a current execution status which may be determined by an application status component 920. The current execution status of an application 110 may comprise a representation of whether the application 110 is currently executing or scheduled to execute. In general, an application 110 may be executing if programming instructions for the application 110 are executing on a processor or if one or more processes, threads, or other programming units are queued for execution, such as may occur in a multi-tasking operating system supporting multiple current processes or threads.

An application 110 may be in an active-use state if the application 110 is executing and available to a user. For instance, in a multi-windowed multi-tasking environment, an application 110 may be in an active-use state if it is available for use in any of one or more windows. In an environment in which only one application is presented at a time, such as may be used in mobile devices, an application 110 may be in the active-use state if it is currently presented to a user on a screen for the device. An application 110 may be in a background-availability state if the application 110 is available on the device but not in the active-use state. This may comprise the application 110 not being in an executing state, such as by having been quit or closed by a user. This may comprise the application 110 having been backgrounded. For instance, an application 110 executing and presented to a user on a mobile device may be in an active-use state and may enter a background-availability state if the application 110 stops being presented to the user, such as by the user selecting to view another application, selecting to view an application launcher, or generally selecting to stop using the application 110. In some instances, an application 110 may still be executing while in the background-availability state. In other instances, the application 110 may stop executing while in the background-availability state. In some instances, the application 110 may execute for a short period after entering the background-availability state in order to perform tasks for the tidy shut down of the application or to prepare for a future use of the application by the user.

For example, the application 110 may be operative to determine whether to receive a new encryption key when it has entered a background-availability state so as to reduce the probability that a new encryption key will be desired the next time the application 110 enters the active-use state. As such, an application status component 920 may be operative to determine that the application 110 has entered a background-availability state. In response to this determination by the application status component 920, the network component 150 may be operative to request a first symmetric encryption key 130 from a device 190, such as by sending a key request 905 to the device 190. The network component 150 may be operative to receive the first symmetric encryption key 130 from the device 190, wherein the first symmetric encryption key 130 may have been generated by the device 190 in response to its reception of the key request 905. In response to the network component 150 receiving the first symmetric encryption key 130, the key component 120 may be operative to store the first symmetric encryption key 130 in a key store 375 for use the next time the application 110 enters the active-use state.

The application status component 920 may be operative to determine that the application 110 has entered an active-use state. In response to this determination, a message component 150 may be operative to construct a message 145 comprising a data section 147, the data section 147 encrypted using the first symmetric encryption key 130. The network component 150 may be operative to transmit the message 145 to the device 190. In some embodiments, the message 145 may comprise a timestamp, the timestamp comprising a time the message 145 was generated, the timestamp indicating the beginning of a validity period for the message 145.

The application status component 920 determining that the application 110 has entered a background-availability state or active-use state may comprise any of the known techniques for making such a determination. For instance, the application 110 may be operative to receive an interrupt, procedure call, or any other form of message from an operating system indicating a change of state. Alternatively or additionally, the application 110 may be operative to automatically determine an active-use state based upon an initiation of executing of the application 110.

In some embodiments, the first symmetric encryption key 130 may only be used if it is still valid. For security purposes, encryption keys older than a predetermined validity period may be discarded as no longer sufficiently secure to use. As such, the key component 120 may be operative to determine that the first symmetric encryption key 130 is valid based on a validity period associated with the first symmetric encryption key 130. The message component 150 may be operative to use the first symmetric encryption key 130 in response to the key component 150 determining that the first symmetric encryption key 130 is valid. The message component 150 may be operative to only use the first symmetric encryption key 130 if and once the key component 150 has determined that the first symmetric encryption key 130 is valid.

Figure 10:
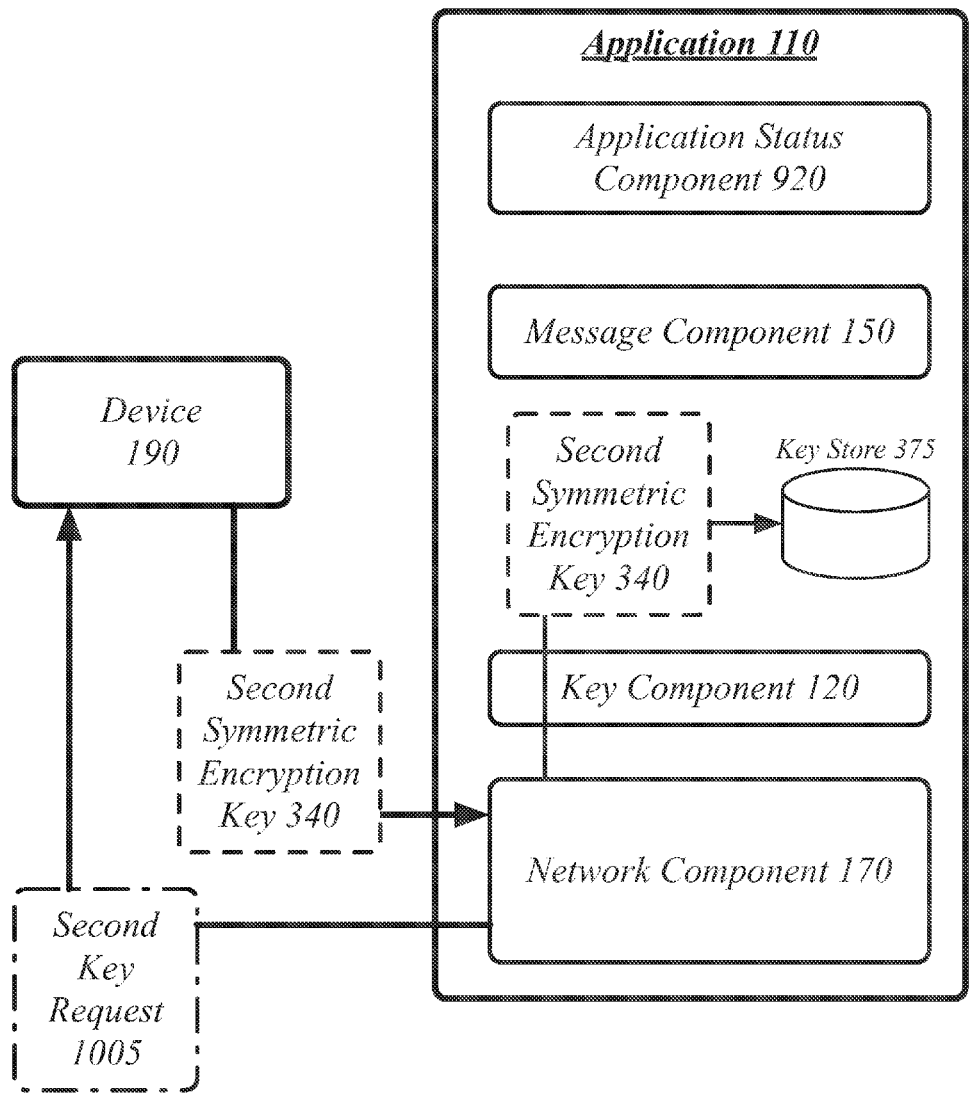
FIG. 10 illustrates an operating environment of the encryption system in which a second symmetric encryption key is requested.

FIG. 10 illustrates an embodiment of an operating environment 1000 for the encryption system 100. As shown in FIG. 10, the application 110 has requested and received a second symmetric encryption key 340 from the device 190.

The application 110 may request a second symmetric encryption key 340 from the device 190 in various different scenarios. In one case, the application 110 may request a second symmetric encryption key 340 to replace the first symmetric encryption key 130 if the first symmetric encryption key 130 has expired.

As such, the application status component 920 may be operative to determine that the application 110 has entered an active-use state. In response to this determination, the key component 120 may be operative to determine that the first symmetric encryption key 130 has expired based on a validity period associated with the first symmetric encryption key 130. In response to this determination of the key component 120, the network component 170 may be operative to request the second symmetric encryption key 340 from the device 190 and to receive the second symmetric encryption key 340 from the device. Once the second symmetric encryption key 340 is received by the network component 170, the key component 120 may be operative to store the second symmetric encryption key 340 in the key store 375. It will be appreciated, in general, that requesting an encryption key, such as the second symmetric encryption key 340, from device 190 may not correspond to requesting a specific encryption key, but instead merely requesting a new encryption key which may be generated on demand, this newly generated key comprising the requested-for second symmetric encryption key 340.

However, the application 110 may also request a second symmetric encryption key 340 when entering the background-availability state (which may correspond exactly to leaving the active-use state) in order to prepare for the next time the application 110 enters the active-use state. An application 110 entering the background-availability state will, by the nature of that state, have some time to perform maintenance tasks without delaying or inconveniencing the user. However, an application 110 entering the active-use state without a valid encryption key available for immediate use will be put in the position of either requesting a new encryption key or using a protocol which does not depend on a cached encryption key (such as HTTPS), either of which may delay a user in making use of the application 110. As such, the application 110 may be benefited by requesting the second symmetric encryption key 340 during a transition to the background-availability state despite the first symmetric encryption key 130 still being valid in order to increase the probability that the cached encryption key will still be valid when the application 110 enters the active-use state.

As such, the application status component 920 may be operative to determine that the application 110 has entered the background-availability state again. This may comprise the first time that the application 110 has entered the background-availability state since the retrieval of the first symmetric encryption key 130 or may comprise any subsequent time that the application 110 has entered the background-availability state. In response to this determination, the key component 120 may be operative to examine a validity period for the first symmetric encryption key 130 and to determine that the validity period for the first symmetric encryption key 130 is less than a refresh threshold. In some cases, this may comprise the validity period having lapsed and thus the first symmetric encryption key 130 being invalid. However, in some cases, this may comprise the validity period having not yet lapsed and thus the first symmetric encryption key 130 still being valid. The refresh threshold may therefore comprise a threshold wherein once the remaining extent of the validity period is less than the refresh threshold, the first symmetric encryption key 130 is not necessarily invalid but may possess sufficiently little remaining valid time that receiving a new encryption key is prudent to reduce the probability that the first symmetric encryption key 130 will be expired the next time the application 110 enters the active-use state. Therefore, in response to this determination of the key component 120, the network component 170 may be operative to request the second symmetric encryption key 340 from the device 190 and to receive the second symmetric encryption key 340 from the device. Once the second symmetric encryption key 340 is received by the network component 170, the key component 120 may be operative to store the second symmetric encryption key 340 in the key store 375.

In some embodiments, the refresh threshold and the validity period may each be static, predetermined values. For instance, if the validity period is twenty-four hours, then the refresh threshold may be twenty hours: after twenty-four hours have passed since the reception of an encryption key, the key would no longer be valid, but after only four hours have passed since the reception of an encryption key, the key would be refreshed once the application 110 has exited. Alternatively, either or both value may be determined on a per-application basis, a per-user basis, a per-device basis, or any other specific basis. In some embodiments, the refresh threshold may be determined according to usage patterns of the application 110. For instance, the refresh threshold may be adjusted dynamically according to a history of the spans of time between an application 110 entering the background-availability state and re-entering the active-use state.

In some embodiments, the application 110 may comprise a web browser 410. In these embodiments, the application status component 920, the key component 120, the message component 150, and the network component 170 may be embedded in a web page 445 for execution by the web browser 410.

Figure 11A:
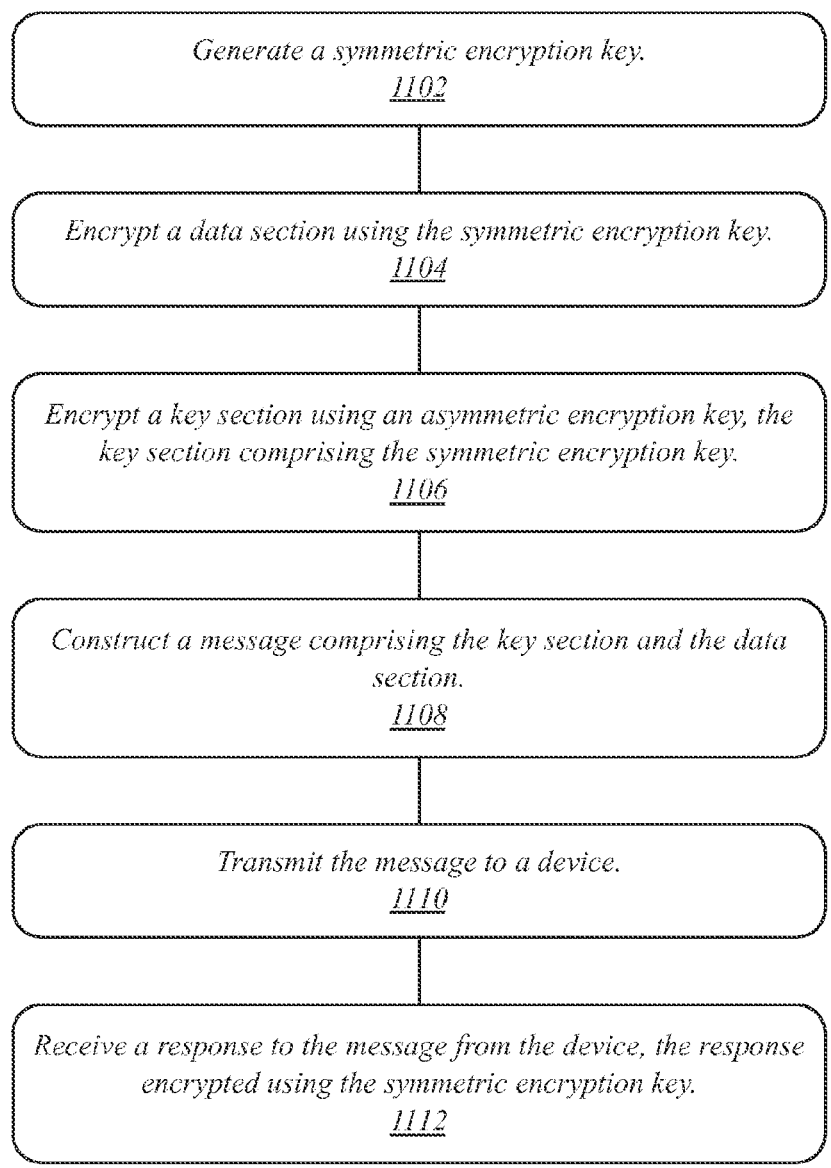
FIG. 11A illustrates an embodiment of a first logic flow for the system of FIG. 1.

FIG. 11A illustrates one embodiment of a logic flow 1100. The logic flow 1100 may be representative of some or all of the operations executed by one or more embodiments described herein.

In the illustrated embodiment shown in FIG. 11A, the logic flow 1100 at block 1102 may generate a symmetric encryption key 130. A symmetric encryption key 130 may comprise an encryption key appropriate for use with a symmetric encryption scheme in which the symmetric encryption key 130 is used to both encrypt and decrypt messages. The symmetric encryption key 130 may be randomly generated according to the requirements of an encryption scheme.

The logic flow 1100 may at block 1104 encrypt a data section 147 using the symmetric encryption key 130. The data section 147 may comprise data 105 and a timestamp for use in validating the authenticity of the sender of the data 105. Encrypting the data section 147 using the symmetric encryption key 130 may comprise using the symmetric encryption key 130 as a variable in a symmetric encryption scheme, the data 105 used as the input to the symmetric encryption scheme.

The logic flow 1100 may at block 1106 may encrypt a key section 149 using an asymmetric encryption key 140, the key section 149 comprising the symmetric encryption key 130. Encrypting the key section 149 using the asymmetric encryption key 140 may comprise using the asymmetric encryption key 140 as a variable in a asymmetric encryption scheme, symmetric encryption key 130 used as the input to the asymmetric encryption scheme.

In some embodiments, the asymmetric encryption key 140 may be retrieved from a key store 375. The asymmetric encryption key 140 may have previously been received from the device 190 as part of a prior message 545 and stored in the key store 375. In some embodiments, the asymmetric encryption key 140 may be invalidated in the key store 375 after the expiration of a validity period associated with the asymmetric encryption key 140.

The logic flow 1100 may at block 1108 may construct a message 145 comprising the key section 149 and the data section 147. Constructing the message 145 may comprise combining the key section 149 and the data section 147 into a single message such as by concatenating them, listing one after another, or any other method of joining the two together.

In some embodiments, the message 145 may comprise a timestamp, the timestamp comprising a time the message 145 was generated, the timestamp indicating the beginning of a validity period for the message 145. The timestamp may be included as part of the key section 149, the data section 147, or as part of the message 145 outside either the key section 149 or the data section 147. The timestamp may be corrected to account for a difference in the clock of the application 110 and the device 190.

The logic flow 1100 at block 1110 may transmit the message 145 to a device 190. Transmitting the message 145 to a device 190 may comprise sending a UDP protocol message, a TCP protocol message, or any other technique for sending a message.

The logic flow 1100 at block 1112 may receive a response 245 to the message 145 from the device 190, the response 245 encrypted using the symmetric encryption key 130.

In some embodiments, the device 190 may comprise a web server 490, the data section 147 comprising a request 405 to receive a web page 445 from the web server 490, and the received response 245 comprising the web page 445. As such, the message 145 may comprise a hypertext transfer protocol (HTTP) request 405, the HTTP request 405 comprising an empty HTTP header and an HTTP body, the HTTP body comprising the key section 149 and the data section 147.

The embodiments are not limited to this example.

Figure 11B:
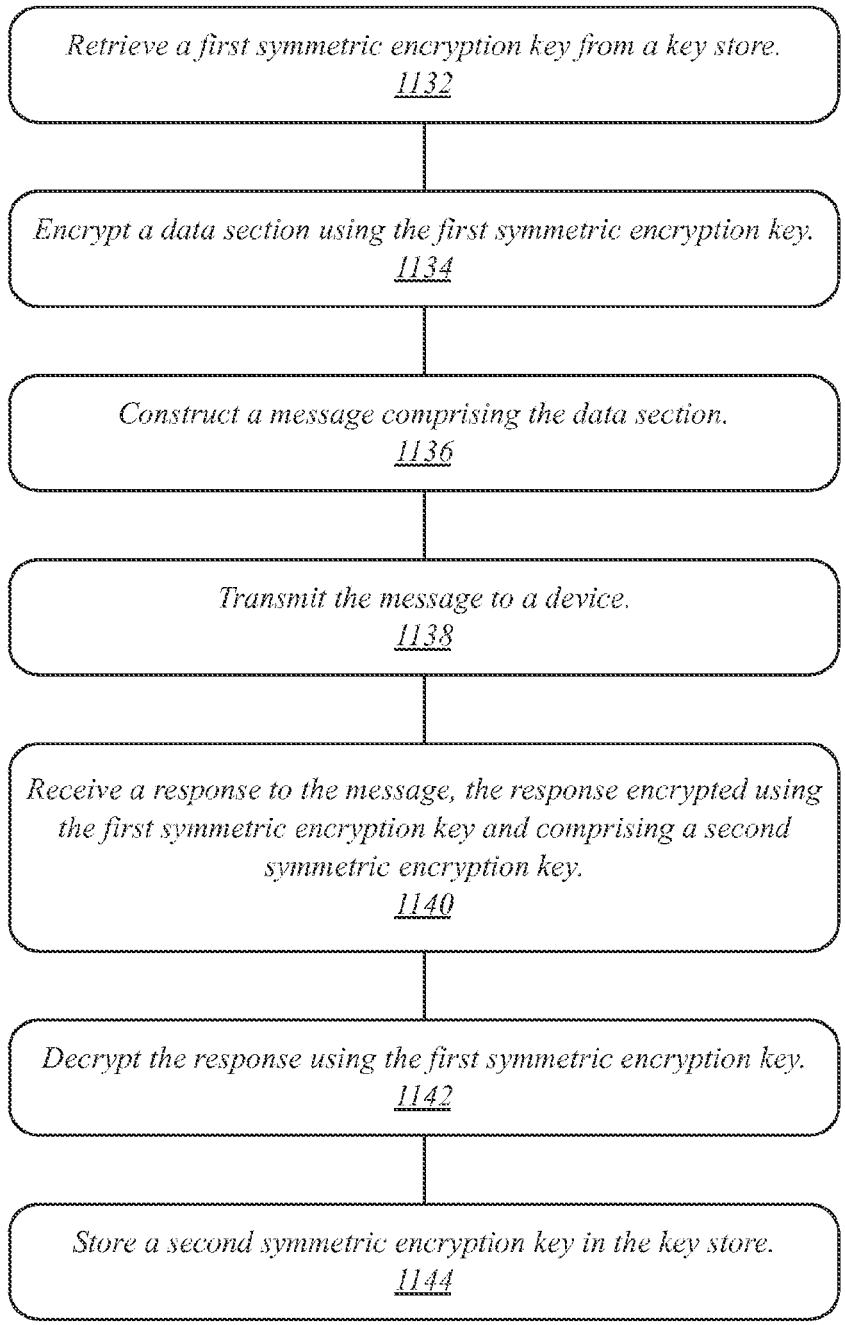
FIG. 11B illustrates an embodiment of a second logic flow for the system of FIG. 1.

FIG. 11B illustrates one embodiment of a second logic flow 1130. The logic flow 1130 may be representative of some or all of the operations executed by one or more embodiments described herein.

In the illustrated embodiment shown in FIG. 11B, the logic flow 1130 at block 1132 may retrieve a first symmetric encryption key 130 from a key store 375. In some embodiments, a prior message 645 may received from the device 190, the prior message 645 comprising the first symmetric encryption key 130, such that the first symmetric encryption key 375 is stored in the key store 375 for later retrieval.

In some embodiments, the symmetric encryption key 130 may have previously been received from the device 190 as part of a prior message 645 and stored in the key store 375. In some embodiments, the symmetric encryption key 130 may be invalidated in the key store 375 after the expiration of a validity period associated with the symmetric encryption key 130.

The logic flow 1130 may at block 1134 encrypt a data section 147 using the first symmetric encryption key 130. The encrypted data section 147 may comprise data 105 for transmission to the device 190. Encrypting the data section 147 using the symmetric encryption key 130 may comprise using the symmetric encryption key 130 as a variable in a symmetric encryption scheme, the data 105 used as the input to the symmetric encryption scheme.

The logic flow 1130 may at block 1136 construct a message 145 comprising the data section 147. Constructing the message may comprise placing data section 147 in the body of a message 145 and determining a header for message 145 to aid in the delivery of message 145 to device 190.

In some embodiments, the message 145 may comprise a timestamp, the timestamp comprising a time the message 145 was generated, the timestamp indicating the beginning of a validity period for the message 145. The timestamp may be included as part of the data section 147 or as part of the message 145 outside of the data section 147. The timestamp may be corrected to account for a difference in the clock of the application 110 and the device 190.

The logic flow 1130 may at block 1138 transmit the message 145 to a device 190. Transmitting the message 145 to a device 190 may comprise sending a UDP protocol message, a TCP protocol message, or any other technique for sending a message.

The logic flow 1130 may at block 1140 receive a response 245 to the message 145, the response 245 encrypted using the first symmetric encryption key 130 and comprising a second symmetric encryption key 340. The second symmetric encryption key may be generated by the device 190 for use in a future communication between application 110 and device 190.

In some embodiments, the device 190 may comprise a web server 490, the data section 147 comprising a request 405 to receive a web page 445 from the web server 490, and the received response 245 comprising the web page 445. As such, the message 145 may comprise a hypertext transfer protocol (HTTP) request 405, the HTTP request 405 comprising an empty HTTP header and an HTTP body, the HTTP body comprising the data section 147.

The logic flow 1130 may at block 1142 decrypt the response 245 using the first symmetric encryption key 130. Decrypting the response 245 using the first symmetric encryption key 130 may comprise using the first symmetric encryption key 130 as a variable in a symmetric encryption scheme, the response 245 used as the input to the symmetric encryption scheme.

The logic flow 1130 may at block 1144 store a second symmetric encryption key 340 in the key store 375.

The embodiments are not limited to this example.

Figure 11C:
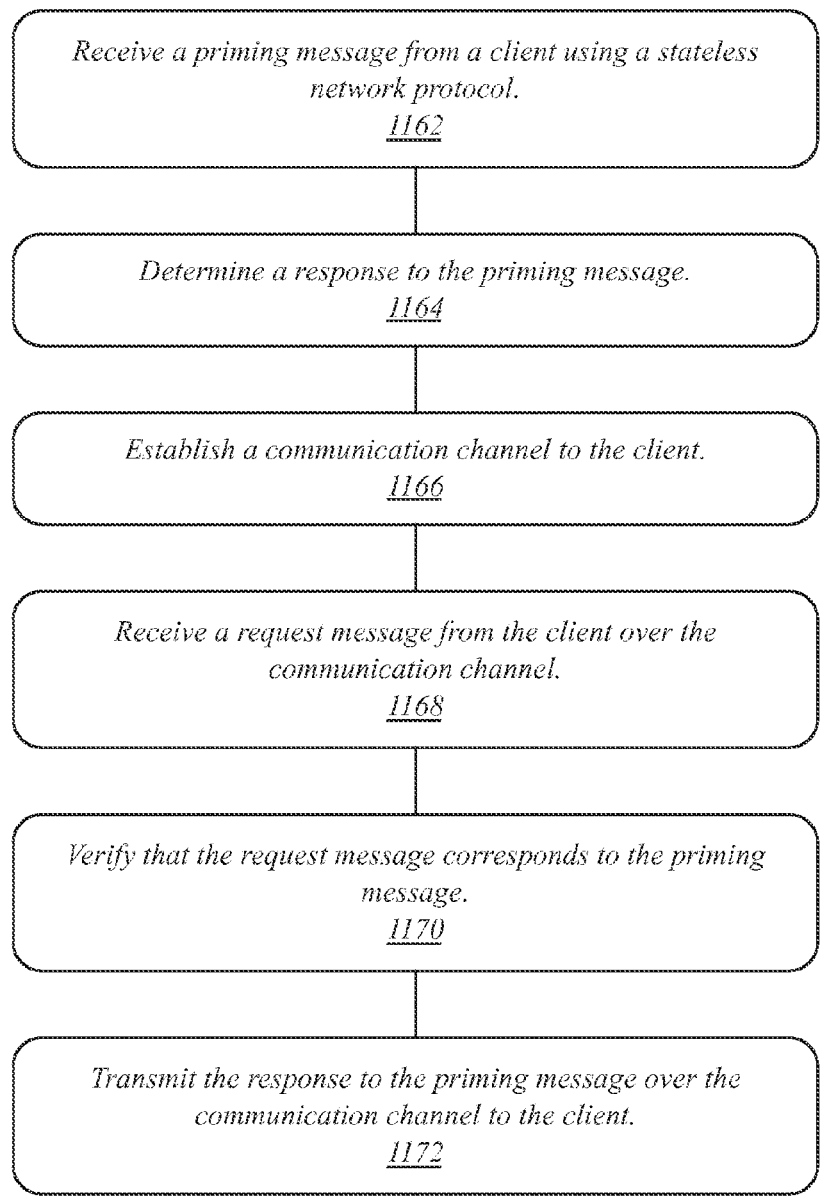
FIG. 11C illustrates an embodiment of a logic flow for the system of FIG. 7.

FIG. 11C illustrates one embodiment of a third logic flow 1160. The logic flow 1160 may be representative of some or all of the operations executed by one or more embodiments described herein.

In the illustrated embodiment shown in FIG. 11C, the logic flow 1160 at block 1162 may receive a priming message 745 from a client 710 using a stateless network protocol. Receiving the priming 745 using a stateliness network protocol may comprising receiving one or more packets or datagrams encoded using the protocol at a device 190. In some embodiments, the stateless network protocol may comprise the UDP protocol.

The logic flow 1160 may at block 1164 determine a response 245 to the priming message 745. In some embodiments, the determined response 245 may be stored in a cache 875.

The logic flow 1160 may at block 1166 establish a communication channel 725 to the client 710. In some embodiments, the communication channel 725 may comprise a transmission control protocol (TCP) channel. In some embodiments, the determined response 245 may be retrieved from the cache 875 in response to establishing the communication channel 725.

The logic flow 1160 may at block 1168 receive a request message 845 from the client 710 over the communication channel 725. In some embodiments, the determined response 245 may be retrieved from the cache 875 in response to receiving the request message 845 over the communication channel 725.

The logic flow 1160 may at block 1170 verify that the request message 845 corresponds to the priming message 745. In some embodiments, the determined response 245 may be retrieved from the cache 875 in response to verify that the request message 845 corresponds to the priming message 745. Alternatively, in some embodiments, verifying that the request message 845 corresponds to the priming message 745 may be accomplished by retrieving the response 245 according to an identifier received part of the request message 845, the identifier corresponding to an identifier received as part of priming message 745.

The logic flow 1160 may at block 1172 transmit the response 245 to the priming message 745 over the communication channel 725 to the client 710.

The embodiments are not limited to this example.

Figure 11D:
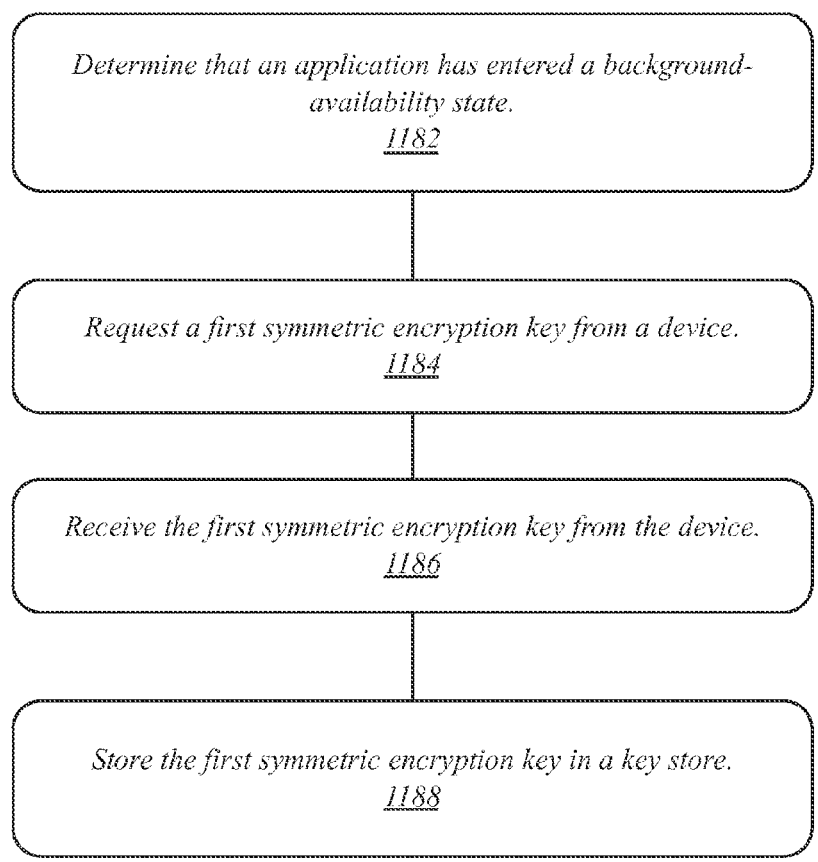
FIG. 11D illustrates an embodiment of a logic flow for the system of FIG. 8

FIG. 11D illustrates one embodiment of a fourth logic flow 1180. The logic flow 1180 may be representative of some or all of the operations executed by one or more embodiments described herein.

In the illustrated embodiment shown in FIG. 11D, the logic flow 1180 at block 1182 may determine that an application 110 has entered a background-availability state. The application 110 having entered a background-availability state may comprise any of the application 110 being informed of an imminent transition to the background-availability state by an operating system, the application 110 performing maintenance tasks related to a transition to the background-availability state, or generally a determination that the application 110 is transitioning from an active-use state to a background-availability state.

The logic flow 1180 may at block 1184 request a first symmetric encryption key 130 from a device 190. This request may comprise a maintenance task performed during the transition from an active-use state to a background-availability state in preparation for a future active-use state.

For instance, the next time the application 110 transition to the active-use state, the logic flow 1180 may determine that the application 110 has entered an active-use state. The application 110 having entered an active-use state may comprise any of the application 110 being informed of an imminent transition to the active-use state by an operating system, the application 110 performing startup tasks related to a transition to the active-use state, or generally a determination that the application 110 is transitioning from a background-use state to an active-use state.

The logic flow 1180 may be operative to construct a message 145 comprising a data section 147, the data section 147 encrypted using the first symmetric encryption key 130. The logic flow 1180 may be further operative to transmit the message 145 to the device 190. In some cases, constructing and transmitting the message 145 may be performed automatically in response to the transition to the active-use state. For instance, the application 110 may be operative to automatically retrieve data from the device 190 upon transition to the active-use state, such as an application 110 for a social networking service automatically retrieving a news feed, profile information, or any other social networking information upon activation. Alternatively, in some cases, constructing and transmitting the message 145 may be performed in response to a user of application 110 requesting that a message 145 be sent, such as to device 190 or using device 190 as a relay. Constructing and transmitting the message 145 may be in response to the user requesting that information be retrieved from device 190 or a service to which device 190 acts as a relay, such that message 145 is a request for said information.

Prior to using the first symmetric encryption key 130, the application 110 may determine whether the first symmetric encryption key 130 is valid. For instance, the logic flow 1180 may determine that the first symmetric encryption key 130 is valid based on a validity period associated with the first symmetric encryption key 130 and use the first symmetric encryption key 130 to encrypt the data section 147 in response to the determination that the first symmetric encryption key 130 is valid. Alternatively, the logic flow 1180 may determine that the application 110 has entered an active-use state, determine that the first symmetric encryption key 130 has expired based on a validity period associated with the first symmetric encryption key 130, request a second symmetric encryption key 340 from the device 190, receive the second symmetric encryption key 340 from the device 190, and store the second symmetric encryption key 340 in the key store 375. In some embodiments, the received second symmetric encryption key 340 may be encrypted by the first symmetric encryption key 130 during transmission from the device 190 to the application 110.

The logic flow 1180 may at block 1186 receive the first symmetric encryption key 130 from the device 190. The first symmetric encryption key 130 may be encrypted during transmission from the device 190 to the application 110. In some cases, the first symmetric encryption key 130 may be encrypted according to a previous encryption key, symmetric or asymmetric, used for communication between the device 190 and the application 110 during the active-use state being ended by the transition to the background-availability state.

The logic flow 1180 may at block 1188 store the first symmetric encryption key 130 in a key store 375. The application 110 may be operative to use and possibly re-use the first symmetric encryption key 130 during one or more subsequent iterations through the active-use state. The application 110 may be operative to use and re-use the first symmetric encryption key 130 until the expiration of a validity period for the first symmetric encryption key 130. Alternatively, the application 110 may be operative to request a new encryption key during a transition to a background-availability state if the amount of time remaining in the validity period is sufficiently short.

As such, the application 110 may be operative to determine that the application 110 has entered the background-availability state again, determine that a validity period for the first symmetric encryption key 130 is less than a refresh threshold, request a second symmetric encryption key 340 from the device 190, receive the second symmetric encryption key 340 from the device 190, and store the second symmetric encryption key 340 in the key store 190.

The embodiments are not limited to this example.

Figure 12:
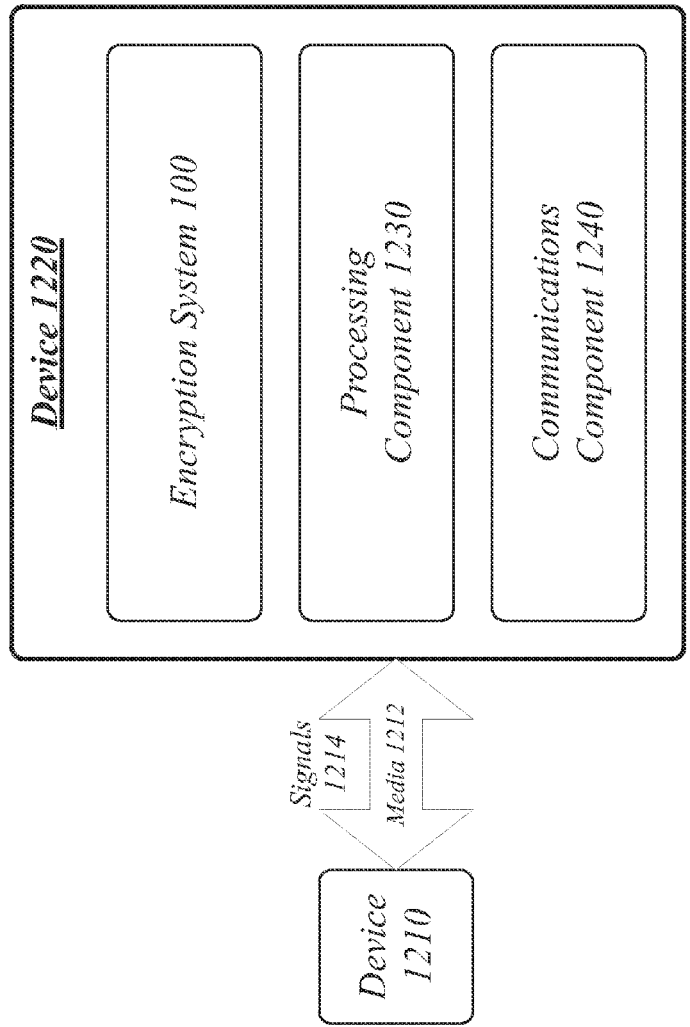
FIG. 12 illustrates an embodiment of a centralized system for the system of FIG. 1 and FIG. 7.

FIG. 12 illustrates a block diagram of a centralized system 1200. The centralized system 1200 may implement some or all of the structure and/or operations for the encryption system 100 in a single computing entity, such as entirely within a single device 1220.

The device 1220 may comprise any electronic device capable of receiving, processing, and sending information for the encryption system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The device 1220 may execute processing operations or logic for the encryption system 100 using a processing component 1230. The processing component 1230 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The device 1220 may execute communications operations or logic for the encryption system 100 using communications component 1240. The communications component 1240 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 1240 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 1212 include wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The device 1220 may communicate with other device 1210 over the communications media 1212 using communications signals 1214 via the communications component 1240. The device 1210 may be internal or external to the device 1220 as desired for a given implementation.

Device 1220 may correspond to a personal computing device used by a user for communication with a web server 490, such as may implement web services for a social networking service. As such, device 1220 may correspond to client 710 as described with reference to the priming system 700. Device 1210 may correspond to device 190. Consequently, signals 1214 sent over media 1212 may comprise a request 405 sent from client 710 to web server 490 requesting web page 445. Signals 1214 may comprise both priming message 745 and request message 845. Priming message 745 and request message 845 may be encrypted according to a symmetric encryption key 130 or according to a symmetric encryption key 130 and an asymmetric encryption key 140.

Figure 13:
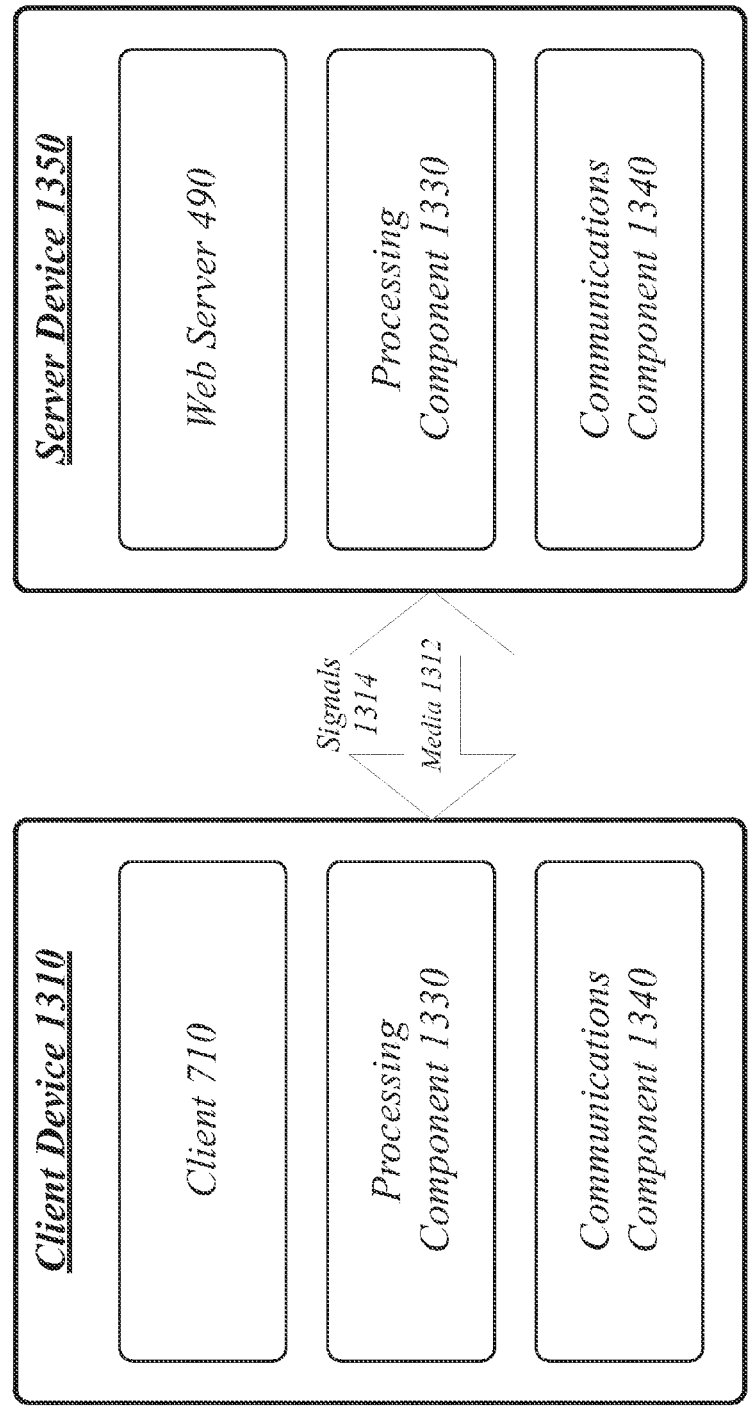
FIG. 13 illustrates an embodiment of a distributed system for the system of FIG. 1 and FIG. 7.

FIG. 13 illustrates a block diagram of a distributed system 1300. The distributed system 1300 may distribute portions of the structure and/or operations for the encryption system 100 across multiple computing entities. Examples of distributed system 1300 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 1300 may comprise a client device 1310 and a server device 1350. In general, the client device 1310 and the server device 1350 may be the same or similar to the client device 1220 as described with reference to FIG. 12. For instance, the client system 1310 and the server system 1350 may each comprise a processing component 1330 and a communications component 1340 which are the same or similar to the processing component 1230 and the communications component 1240, respectively, as described with reference to FIG. 12. In another example, the devices 1310, 1350 may communicate over a communications media 1312 using communications signals 1314 via the communications components 1340.

The client device 1310 may comprise or employ one or more client programs that operate to perform various methodologies in accordance with the described embodiments. In one embodiment, for example, the client device 1310 may implement client 710 running application 110. As such, client device 1310 may comprise key component 120, message component 150, and network component 170.

The server device 1350 may comprise or employ one or more server programs that operate to perform various methodologies in accordance with the described embodiments. In one embodiment, for example, the server device 1350 may implement web server 490. As such, server device 1350 may comprise reception component 770, precomputation component 720, and response component 820.

Figure 14:
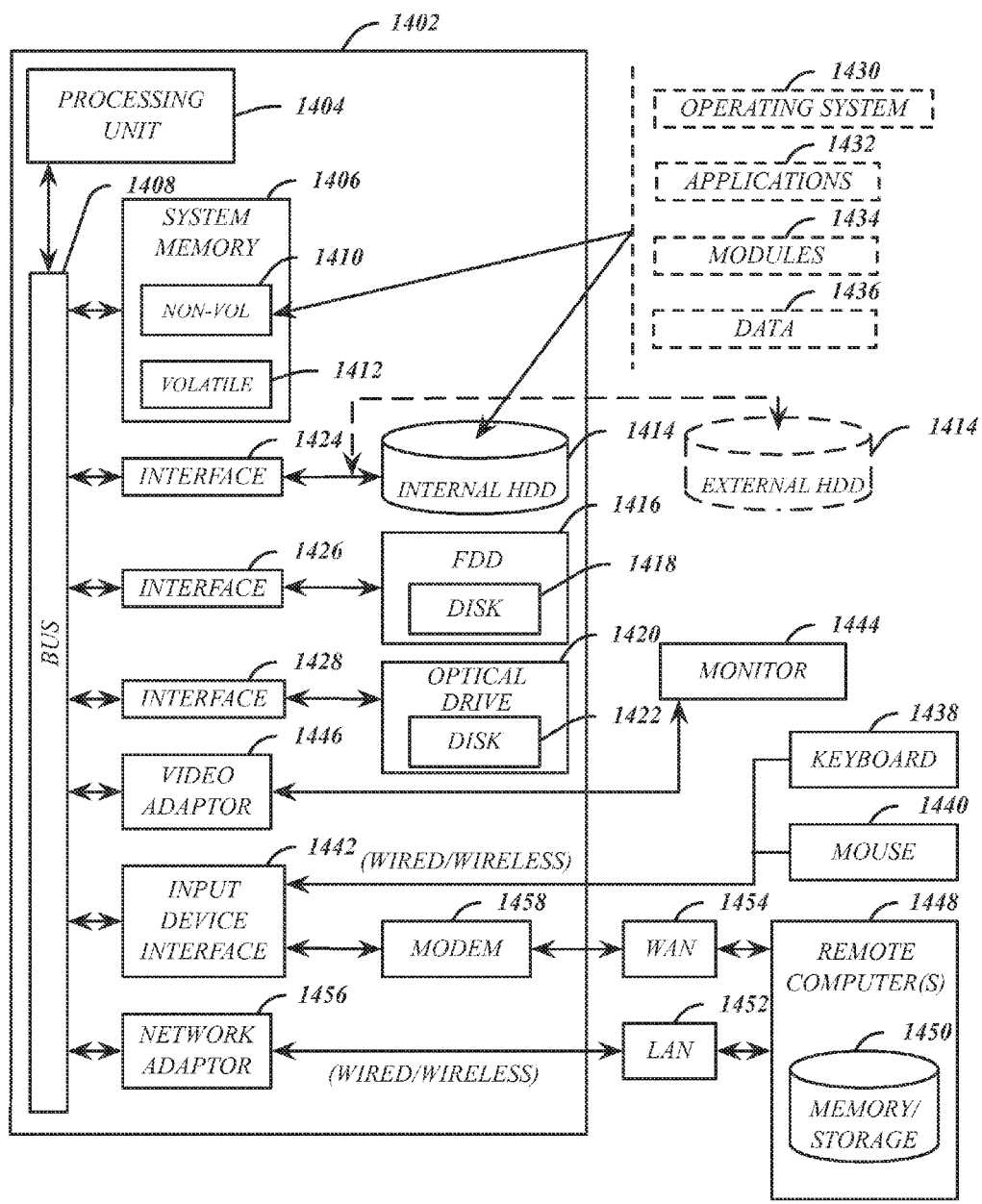
FIG. 14 illustrates an embodiment of a computing architecture.

FIG. 14 illustrates an embodiment of an exemplary computing architecture 1400 suitable for implementing various embodiments as previously described. In one embodiment, the computing architecture 1400 may comprise or be implemented as part of an electronic device. Examples of an electronic device may include those described with reference to FIG. 12, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 1400. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 1400 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 1400.

As shown in FIG. 14, the computing architecture 1400 comprises a processing unit 1404, a system memory 1406 and a system bus 1408. The processing unit 1404 can be any of various commercially available processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core (2) Duo®, Itanium®, Pentium®, Xeon®, and XScale® processors; and similar processors. Dual microprocessors, multi-core processors, and other multi-processor architectures may also be employed as the processing unit 1404.

The system bus 1408 provides an interface for system components including, but not limited to, the system memory 1406 to the processing unit 1404. The system bus 1408 can be any of several types of bus structure that may further interconnect to a memory bus (with or without a memory controller), a peripheral bus, and a local bus using any of a variety of commercially available bus architectures. Interface adapters may connect to the system bus 1408 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 1400 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 1406 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 14, the system memory 1406 can include non-volatile memory 1410 and/or volatile memory 1412. A basic input/output system (BIOS) can be stored in the non-volatile memory 1410.

The computer 1402 may include various types of computer-readable storage media in the form of one or more lower speed memory units, including an internal (or external) hard disk drive (HDD) 1414, a magnetic floppy disk drive (FDD) 1416 to read from or write to a removable magnetic disk 1418, and an optical disk drive 1420 to read from or write to a removable optical disk 1422 (e.g., a CD-ROM or DVD). The HDD 1414, FDD 1416 and optical disk drive 1420 can be connected to the system bus 1408 by a HDD interface 1424, an FDD interface 1426 and an optical drive interface 1428, respectively. The HDD interface 1424 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 1410, 1412, including an operating system 1430, one or more application programs 1432, other program modules 1434, and program data 1436. In one embodiment, the one or more application programs 1432, other program modules 1434, and program data 1436 can include, for example, the various applications and/or components of the encryption system 100.

A user can enter commands and information into the computer 1402 through one or more wire/wireless input devices, for example, a keyboard 1438 and a pointing device, such as a mouse 1440. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 1404 through an input device interface 1442 that is coupled to the system bus 1408, but can be connected by other interfaces such as a parallel port, IEEE 1394 serial port, a game port, a USB port, an IR interface, and so forth.

A monitor 1444 or other type of display device is also connected to the system bus 1408 via an interface, such as a video adaptor 1446. The monitor 1444 may be internal or external to the computer 1402. In addition to the monitor 1444, a computer typically includes other peripheral output devices, such as speakers, printers, and so forth.

The computer 1402 may operate in a networked environment using logical connections via wire and/or wireless communications to one or more remote computers, such as a remote computer 1448. The remote computer 1448 can be a workstation, a server computer, a router, a personal computer, portable computer, microprocessor-based entertainment appliance, a peer device or other common network node, and typically includes many or all of the elements described relative to the computer 1402, although, for purposes of brevity, only a memory/storage device 1450 is illustrated. The logical connections depicted include wire/wireless connectivity to a local area network (LAN) 1452 and/or larger networks, for example, a wide area network (WAN) 1454. Such LAN and WAN networking environments are commonplace in offices and companies, and facilitate enterprise-wide computer networks, such as intranets, all of which may connect to a global communications network, for example, the Internet.

When used in a LAN networking environment, the computer 1402 is connected to the LAN 1452 through a wire and/or wireless communication network interface or adaptor 1456. The adaptor 1456 can facilitate wire and/or wireless communications to the LAN 1452, which may also include a wireless access point disposed thereon for communicating with the wireless functionality of the adaptor 1456.

When used in a WAN networking environment, the computer 1402 can include a modem 1458, or is connected to a communications server on the WAN 1454, or has other means for establishing communications over the WAN 1454, such as by way of the Internet. The modem 1458, which can be internal or external and a wire and/or wireless device, connects to the system bus 1408 via the input device interface 1442. In a networked environment, program modules depicted relative to the computer 1402, or portions thereof, can be stored in the remote memory/storage device 1450. It will be appreciated that the network connections shown are exemplary and other means of establishing a communications link between the computers can be used.

The computer 1402 is operable to communicate with wire and wireless devices or entities using the IEEE 802 family of standards, such as wireless devices operatively disposed in wireless communication (e.g., IEEE 802.14 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.14x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 15:
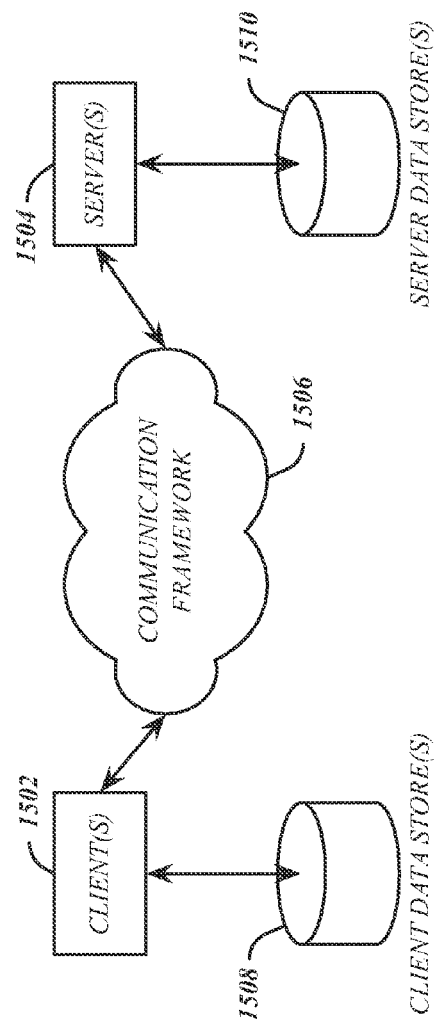
FIG. 15 illustrates an embodiment of a communications architecture.

FIG. 15 illustrates a block diagram of an exemplary communications architecture 1500 suitable for implementing various embodiments as previously described. The communications architecture 1500 includes various common communications elements, such as a transmitter, receiver, transceiver, radio, network interface, baseband processor, antenna, amplifiers, filters, power supplies, and so forth. The embodiments, however, are not limited to implementation by the communications architecture 1500.

As shown in FIG. 15, the communications architecture 1500 comprises includes one or more clients 1502 and servers 1504. The clients 1502 may implement the client device 1310. The servers 1504 may implement the server device 1350. The clients 1502 and the servers 1504 are operatively connected to one or more respective client data stores 1508 and server data stores 1510 that can be employed to store information local to the respective clients 1502 and servers 1504, such as cookies and/or associated contextual information.

The clients 1502 and the servers 1504 may communicate information between each other using a communication framework 1506. The communications framework 1506 may implement any well-known communications techniques and protocols. The communications framework 1506 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1506 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1502 and the servers 1504. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

With general reference to notations and nomenclature used herein, the detailed descriptions which are enclosed may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

The invention claimed is:
1. An apparatus, comprising:
a processor circuit;
    a key component operative on the processor circuit to generate a symmetric encryption key;
    a message component operative on the processor circuit to construct a priming message and a request message, the constructed priming message comprising a priming key section and a priming data section, the constructed request message comprising a request key section and request data section, the priming key section and the request key section encrypted using an asymmetric encryption key and comprising the symmetric encryption key, the priming data section and the request data section encrypted using the symmetric encryption key; and a network component operative on the processor circuit to receive a prior message comprising the asymmetric encryption key, and transmit the priming message and the request message to a device.

2. The apparatus of claim 1, the priming message comprising a timestamp, the timestamp comprising a time the priming message was generated, the timestamp indicating the beginning of a validity period for the priming message.

3. The apparatus of claim 1, the network component operative to receive a response to the priming message from the device, the response encrypted using the symmetric encryption key.

4. The apparatus of claim 3, the device comprising a web server, the priming data section comprising a request to receive a web page from the web server, and the received response comprising the web page.

5. The apparatus of claim 1, the priming message comprising a hypertext transfer protocol (HTTP) request, the HTTP request comprising an empty HTTP header and an HTTP body, and the HTTP body comprising the priming key section and the priming data section.

6. The apparatus of claim 1, the key component, the message component, and the network component embedded in a web page for execution by a web browser.

7. The apparatus of claim 1, the network component operative to receive the prior message from the device, the key component operative to store the asymmetric encryption key in a key store.

8. The apparatus of claim 7, the key component operative to invalidate the asymmetric encryption key in the key store after the expiration of a validity period associated with the asymmetric encryption key.

9. A computer-implemented method, comprising:
receive a prior message comprising an asymmetric encryption key;
generating a symmetric encryption key;
encrypting a priming data section and a request data section using the symmetric encryption key;
encrypting a priming key section and a request key section using the asymmetric encryption key, the priming key section and the request key section comprising the symmetric encryption key;
constructing a priming message and a request message, the constructed priming message comprising the priming key section and the priming data section, the request message comprising the request key section and the request data section; and
transmitting the priming message and the request message to a device.

10. The method of claim 9, the priming message comprising a timestamp, the timestamp comprising a time the priming message was generated, the timestamp indicating the beginning of a validity period for the priming message.

11. The method of claim 9, comprising:
receiving a response to the priming message from the device, the response encrypted using the symmetric encryption key.

12. The method of claim 11, the device comprising a web server, the priming data section comprising a request to receive a web page from the web server, the received response comprising the web page, the priming message comprising a hypertext transfer protocol (HTTP) request, the HTTP request comprising an empty HTTP header and an HTTP body, and the HTTP body comprising the priming key section and the priming data section.

13. The method of claim 9, comprising:
receiving the prior message from the device;
storing the asymmetric encryption key in a key store; and
retrieving the asymmetric encryption key from the key store.

14. The method of claim 13, comprising:
invalidating the asymmetric encryption key in the key store after the expiration of a validity period associated with the asymmetric encryption key.

15. At least one non-transitory computer-readable storage medium comprising instructions that, when executed, cause a system to:
receive a prior message comprising an asymmetric encryption key;
generate a symmetric encryption key;
encrypt a priming data section and a request data section using the symmetric encryption key;
encrypt a priming key section and request data section using an asymmetric encryption key, the priming key section comprising the symmetric encryption key;
construct a priming message and a request message comprising the key section and the data section;
transmit the priming message and the request message to a device; and
receive a response to the priming message from the device, the response encrypted using the symmetric encryption key.

16. The computer-readable storage medium of claim 15, the priming message comprising a timestamp, the timestamp comprising a time the priming message was generated, the timestamp indicating the beginning of a validity period for the priming message.

17. The computer-readable storage medium of claim 15, the device comprising a web server, the priming data section comprising a request to receive a web page from the web server, and the received response comprising the web page.

18. The computer-readable storage medium of claim 17, the priming message comprising a hypertext transfer protocol (HTTP) request, the HTTP request comprising an empty HTTP header and an HTTP body, and the HTTP body comprising the priming key section and the priming data section.

19. The computer-readable storage medium of claim 15 comprising further instructions that, when executed, cause a system to:
receive the prior message from the device;
store the asymmetric encryption key in a key store; and
retrieve the asymmetric encryption key from the key store.

20. The computer-readable storage medium of claim 19 comprising further instructions that, when executed, cause a system to:
invalidate the asymmetric encryption key in the key store after the expiration of a validity period associated with the asymmetric encryption key.

* * * * *